(12) United States Patent
Stiller

(10) Patent No.: US 11,858,818 B2
(45) Date of Patent: *Jan. 2, 2024

(54) PROCESSES AND COMPOSITIONS FOR CARBON FOAM MATERIALS

(71) Applicant: West Virginia University, Morgantown, WV (US)

(72) Inventor: Alfred H. Stiller, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 644 days.

This patent is subject to a terminal disclaimer.

(21) Appl. No.: 16/662,750

(22) Filed: Oct. 24, 2019

(65) Prior Publication Data

US 2021/0122640 A1    Apr. 29, 2021

(51) Int. Cl.
*C01B 32/05* (2017.01)
*C01B 32/33* (2017.01)
*C01B 32/342* (2017.01)
*C01B 32/354* (2017.01)

(52) U.S. Cl.
CPC ............. *C01B 32/33* (2017.08); *C01B 32/05* (2017.08); *C01B 32/342* (2017.08); *C01B 32/354* (2017.08); *C01P 2002/60* (2013.01); *C01P 2002/72* (2013.01); *C01P 2002/85* (2013.01); *C01P 2004/02* (2013.01); *C01P 2004/03* (2013.01); *C01P 2006/10* (2013.01); *C01P 2006/12* (2013.01); *C01P 2006/40* (2013.01)

(58) Field of Classification Search
CPC .................................................. C01B 32/05
See application file for complete search history.

(56) References Cited

U.S. PATENT DOCUMENTS

| | | |
|---|---|---|
| 3,256,101 A | 6/1966 | Arns |
| 4,014,817 A | 3/1977 | Johnson et al. |
| 4,619,805 A | 10/1986 | Dias et al. |
| 4,921,831 A | 5/1990 | Nakai |
| 6,033,506 A | 3/2000 | Klett |
| 6,183,854 B1 | 2/2001 | Stiller et al. |
| 6,544,491 B1 | 4/2003 | Stiller et al. |
| 6,656,239 B1 | 12/2003 | Rogers |
| 6,797,251 B1 | 9/2004 | Bennett et al. |
| 6,860,910 B2 | 3/2005 | Rogers et al. |
| 7,767,183 B2 | 8/2010 | Matviya |
| 8,226,816 B2 | 7/2012 | Kennel et al. |
| 8,465,561 B2 | 6/2013 | Stiller et al. |
| 10,941,042 B2 * | 3/2021 | Stiller .................. C01B 32/382 |
| 2004/0177548 A1 | 9/2004 | Rogers |
| 2004/0227879 A1 | 11/2004 | Stiller et al. |
| 2006/0239889 A1 | 10/2006 | Lewis et al. |
| 2009/0061312 A1 | 3/2009 | Zhamu et al. |
| 2011/0028708 A1 | 2/2011 | White et al. |
| 2011/0189077 A1 | 8/2011 | Theriault |
| 2012/0097519 A1 | 4/2012 | Stiller |
| 2013/0004408 A1 | 1/2013 | Dua et al. |

FOREIGN PATENT DOCUMENTS

WO    WO2003067931 A1    8/2003

OTHER PUBLICATIONS

German, Prediction of sintered density for bimodal power mixtures, Metallurgical Transactions, A 23.5: 1455-1465, p. 1455 col. 1 par 2; p. 1464 col. 1 para 2-3, 1992.
Yang et al., Carbon foam produced from fluid catalytic cracking slurry at atmospheric pressure, New Carbon Materials, vol. 23, No. 2, 2008.
Shang et al, Preparing high surface area porous carbon from biomass by carbonization in a molten salt medium, RSC Advances 5.92:75728-75734, Abstract, p. 4 para 2, 2015.
Toda et al., The influence of particle size distribution of coal on the fluidity of coal-water mixtures, Power Technology 55.4:214-245, p. 240 col. 1 para 1-2, 1988.

* cited by examiner

*Primary Examiner* — Stuart L Hendrickson
(74) *Attorney, Agent, or Firm* — Thomas | Horstemeyer, LLP

(57) ABSTRACT

Described herein are processes for preparation of a carbon foam material, the processes including the steps of heating in a microwave heating apparatus a mixture including a coal material and at least one additional agent. The additional agent can be a flux agent such a carbohydrate syrup, a secondary flux agent, a lignocellulosic waste material, a conductive carbon compound, a solvent, and combinations thereof. Also described are processes for calcining a carbon foam material in a furnace, a microwave heating apparatus, or an inductive field heater. The described calcining process can impart electrical conductivity and mechanical strength to carbon foams. Also described are carbon foam materials, calcined carbon foams, and composite materials. This abstract is intended as a scanning tool for purposes of searching in the particular art and is not intended to be limiting of the present disclosure.

23 Claims, 26 Drawing Sheets

PROCESSES AND COMPOSITIONS FOR CARBON FOAM MATERIALS

BACKGROUND

Foams are described as porous solids. Conventionally, there have been three basic processes existed for producing carbon foams. In the first, N-methyl-2-pyrrolidone (NMP) soluble extracts from coal are heated to near 500° C. at 500 psig. The externally-applied pressure prevents the rapid escape of volatiles expelled during this process, creating bubbles in the molten liquid extracts. The extracts further crosslink as the process continues, volatile components escape, and a porous solid is produced. In a second currently-available process, carbon-based foams can be produced via pyrolization of foamed organic materials, such as polyurethane foams, to a carbon char, leaving the skeleton of the foamed organic material intact. Finally, carbon foams can be produced from pitches, such as coal tar pitch, that have been blended with ground coal. This mixture is then heated to nearly 500° C. under about 500 psig of pressure. In this process, which is similar to the first described process above, the pitch devolatilizes, with the volatiles forming a flux that promotes devolatilization and crosslinking within the coal articles. The result is a good quality carbon foam produced at relatively mild conditions.

However, the foregoing currently available processes for preparation of a carbon foam are limited by cost and/or scalability. The first and third processes described above are only feasible at significantly elevated pressures, a requirement that severely limits the dimensional scalability of the process. The second process described above requires a foamed organic material, which is a relatively rare and costly material input, rather than inexpensive and widely-available coal materials. Accordingly, a need exists to develop scalable and cost-effective processes for producing carbon foam derived from coal. These new processes would, ideally, reduce the capital costs and operating costs associated with carbon foam production while also creating new market opportunities for production of value-added products incorporating carbon foam.

Thus, despite advances in research directed to carbon foam materials, there remains a scarcity of processes to preparation of carbon foam materials at low operating pressure and at reasonable cost. These needs and other needs are satisfied by the present disclosure.

SUMMARY

In one aspect, disclosed herein is a process for producing a carbon foam material, the process including a heating step that includes heating a homogeneous mixture of a coal material and at least one additional agent in a microwave heating apparatus, wherein the homogeneous mixture of a coal material and at least one additional agent includes a coal material present in an amount of from about 20 wt % to about 75 wt % based on the total weight of the mixture and at least one additional agent present in an amount of rom about 25 wt % to about 80 wt % based on the total weight of the mixture and wherein the additional agent is capable of absorbing microwave radiation. In a further aspect, in the heating step, the mixture is heated to a temperature of from about 250° C. to about 700° C. for from about 1 minute to about 60 minutes. In still another aspect, the coal material has a particle size of between about 10 mesh and about 400 mesh, or between about 20 mesh and about 150 mesh. In another aspect, the coal material can be a high-volatile or low-volatile sub-bituminous coal material, or can be pitch.

In another aspect, the additional agent can be or include a flux agent. In some aspects, the flux agent is or includes a carbohydrate syrup such as, for example, high fructose corn syrup, honey, maple syrup, molasses, agave nectar, barley malt syrup, brown rice syrup, corn syrup that has not been enhanced in fructose, date syrup, evaporated cane juice, glucose syrup, inverted sugar syrup, yacon syrup, or a combination thereof. In another aspect, the flux agent can further include a secondary flux agent. In some aspects, the secondary flux agent can be a volatile compound produced in a coal conversion process, a coal tar, a product of petroleum distillation, or a combination thereof. In another aspect, the additional agent can contain a lignocellulosic waste material such as, for example, sodium lignosulfonate. In some aspects, the additional agent includes a conductive carbon compound including, but not limited to, a carbon fiber, a carbon nanofiber, a carbon nanotube, a carbon flake, carbon black, a needle coke, graphene, graphene oxide, graphite, and combinations thereof. In still another aspect, the additional agent includes a solvent including, but not limited to, N-methyl-2-pyrrolidone, kerosene, and combinations thereof.

In one aspect, disclosed herein is a process for calcining a carbon foam material, the process including the steps of heating the carbon foam material to a temperature of from about 900° C. to about 1350° C. for a period of from about 10 seconds to about 3 hours, wherein calcining imparts electrical conductivity and mechanical stability to the carbon foam material. In a further aspect, the carbon foam material can be calcined in a furnace for from about 1 hour to about 3 hours. In another aspect, the carbon foam material can be calcined in a microwave heating apparatus for from about 1 minute to about 10 minutes. In still another aspect, the carbon foam material is calcined in an inductive field heater for from about 10 seconds to about 1 minute. In some aspects, calcination can be conducted in a furnace, a microwave, or an inductive field heating apparatus.

Also disclosed herein are carbon foam materials and calcined carbon foam materials produced by the disclosed processes, as well as composite materials including the calcined carbon foam materials produced by the disclosed processes. In some aspects, the carbon foam materials have a density of from about 0.5 to about 1.5 g/mL, a resistivity of from about 0.1 to about 0.5 $\Omega/ft^2$, a surface area of from about 2 to about 3 $m^2/g$, and a grain size of from about 10 to about 390 μm. Also disclosed herein are articles incorporating carbon foams with the disclosed properties.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE DRAWINGS

The accompanying drawings, which are incorporated in and constitute a part of this specification, illustrate several aspects and together with the description serve to explain the principles of the disclosure.

Figure 1:
FIG. 1 shows a representative image of a disclosed 80-100 mesh particle size carbon foam prepared from low volatile bituminous coal feedstock using a disclosed method as described in Example 5.
Figure 2:
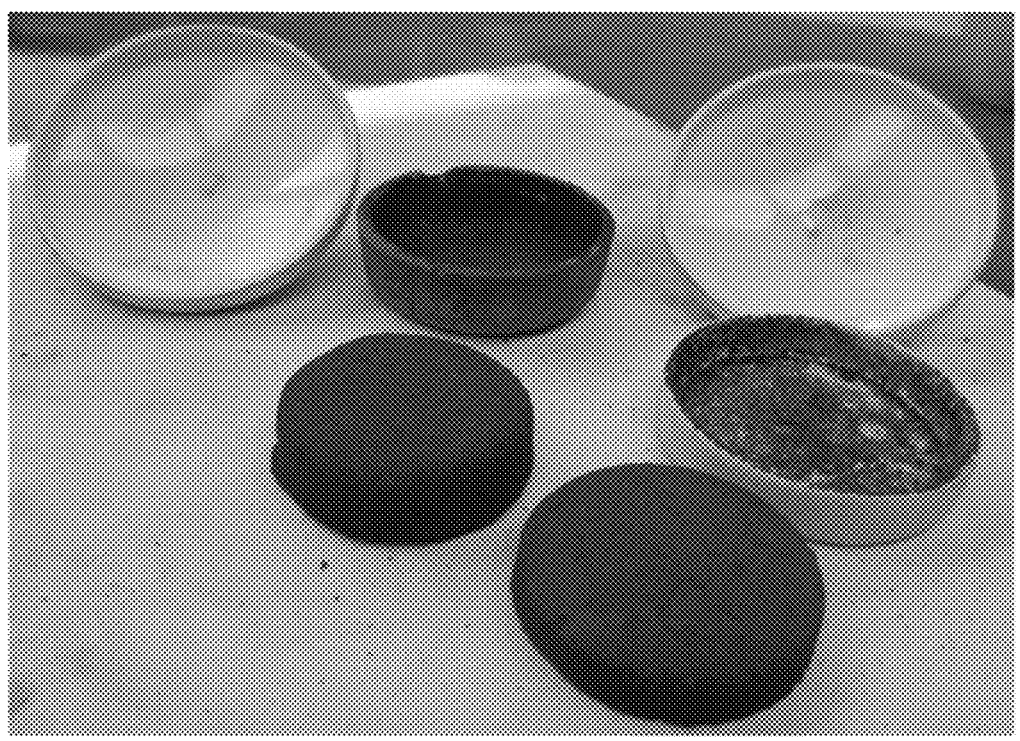
FIG. 2 shows a representative image of a disclosed 80-100 mesh particle size carbon foam prepared from low volatile bituminous coal feedstock using a disclosed method as described in Example 5.
Figure 3:
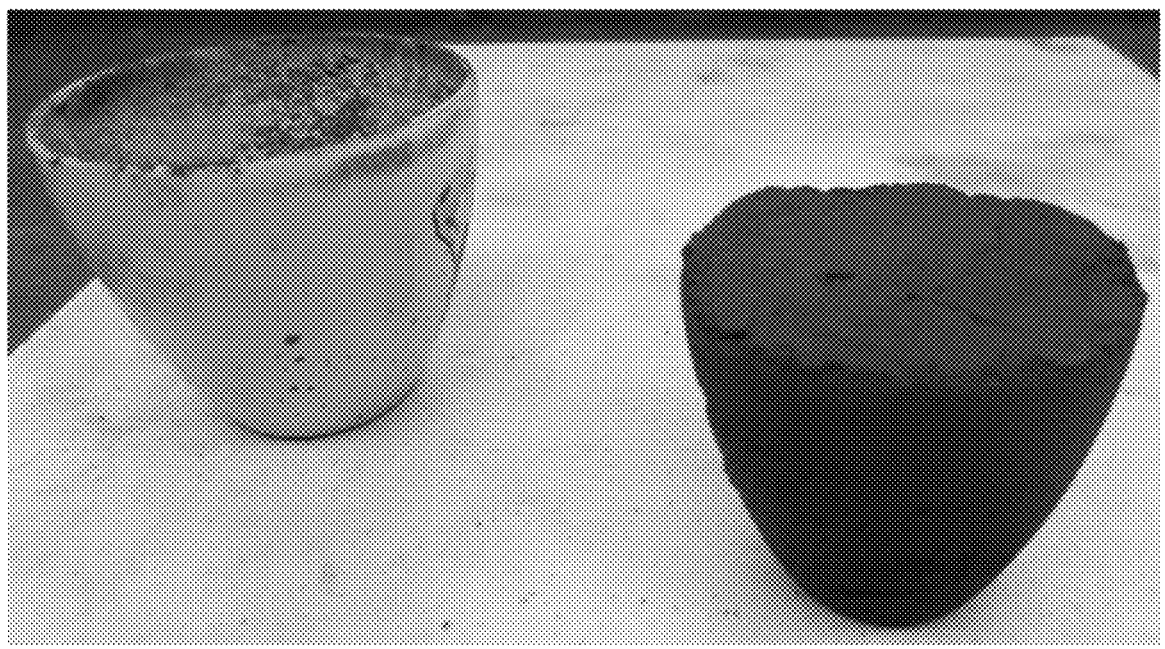
FIG. 3 shows a representative image of a larger sample of a disclosed carbon foam prepared from low volatile bituminous coal feedstock using a disclosed method as described in Example 5.
Figure 4:
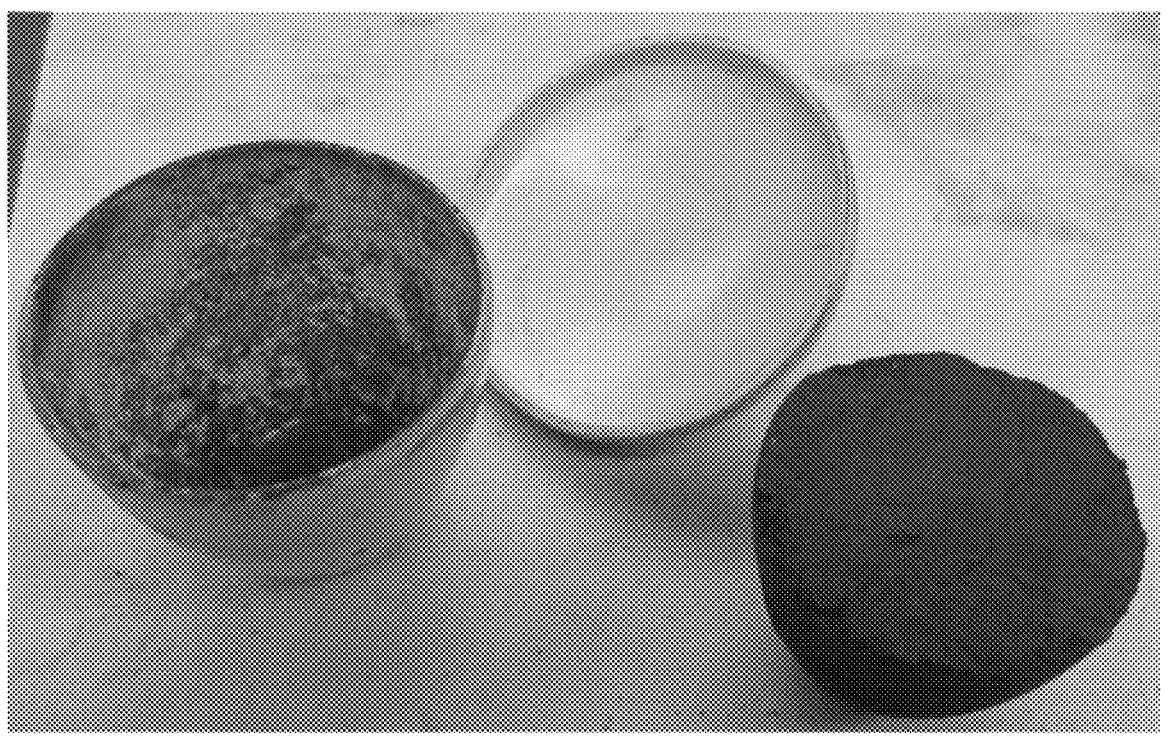
FIG. 4 shows a representative image of a larger sample of a disclosed carbon foam prepared from low volatile bituminous coal feedstock using a disclosed process and the additional carbon materials produced remaining in the crucible using a disclosed method as described in Example 5.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

The disclosures herein will be described more fully hereinafter with reference to the accompanying drawings, in which some, but not all possible embodiments are shown. Indeed, disclosures may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

As used herein, nomenclature for compounds, including organic compounds, can be given using common names, IUPAC, IUBMB, or CAS recommendations for nomenclature.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "a coal material," "a flux agent mixture," or "a secondary carbon material" includes mixtures of two or more such coal materials, flux agent mixtures, or secondary carbon materials, and the like.

As used herein, "caking coal" is coal that softens and forms a solid residue on heating to high temperatures (i.e., >1100° C.) to drive off volatile matter in low-to-no oxygen environments. Alternatively, a "non-caking coal" is one that forms a char when heated to devolatilizing conditions. "Caking coal" is also referred to as "coking coal" if the solid residue is coke. In some aspects, "caking" is also referred to as "agglomerating."

As used herein, "bituminous coal" is a soft coal containing bitumen, which is a viscous form of petroleum. Typically, bituminous coal contains greater than 5% volatile matter. Bituminous coal can be high volatile or low volatile as defined herein. "Low volatile" bituminous coal can have about 5% volatile matter, whereas "high volatile" bituminous coal can have up to 30% volatile matter. In one aspect, bituminous coal is useful as a starting material for carbon foams in the processes described herein.

"Lignite" coal is sometimes referred to as brown coal and has a fixed carbon content of about 25%, a high moisture content, and an ash content ranging from 6-19%. Lignite coal typically has a high content of volatile matter.

As used herein, "sub-bituminous" coal has properties between those of lignite coal and those of bituminous coal.

"High volatile" bituminous coal as used herein is coal that has a volatile matter content of greater than about 31% (or has a fixed carbon content of less than 69%). As used herein, "low volatile" bituminous coal is used to refer to coal that has a volatile matter content of between about 14% and about 22% (or has a fixed carbon content of from 78% to 86%).

A "flux agent" or "fluxing agent" or "flux material" as used herein refers to any material that responds to the heating method useful herein and further interacts with the coal used herein to generate heat necessary to fuse coal particles together during carbon foam formation. In some aspects, the flux agent responds to the frequency range of microwave radiation used herein. As an example, the flux agent may have hydroxyl groups free to rotate and to absorb energy of the frequency of microwave radiation. In some aspects, the flux agent may be fructose or a carbohydrate syrup and may also include kerosene and/or recovered coal volatiles from the coal conversion process. In a further aspect, these recovered volatiles may include phenanthrene. In one aspect, high volatile bituminous coals will require lower amounts of flux agent than low volatile bituminous coals.

"Pitch" as used herein is a complex mixture of high boiling point organic molecules that is normally a solid at room temperature but that becomes a viscoelastic fluid when heated. Pitch is derived, as used herein, from coal tar. In some aspects, pitch can be incorporated into foaming mixtures as a flux agent for transferring heat to coal particles and/or otherwise assisting in carbon foam preparation. In other aspects, pitch can be used as a carbon source for carbon foams made without coal particles. Meanwhile, a "foaming pitch" is a coal tar distillate that can be made from sub-bituminous, bituminous, or lignite coal. In one aspect, a foaming pitch can be used as an additional agent or a flux agent, thereby assisting in the process of forming green foam from carbon materials.

"Microwave" radiation may be useful in the processes disclosed herein. Microwave radiation is electromagnetic radiation with a wavelength of about 1 m to 1 mm and a frequency between 300 MHz and 300 GHz. In one aspect, the microwave radiation can be from a household microwave oven or an industrial microwave chamber. In some aspects, microwave radiation is absorbed by hydroxyl groups in a flux agent, which causes heating that is then transferred to coal particles, which in turn absorb heat and give off volatile matter, producing a porous structure.

"Induction heating" or "inductive heating" as used herein refers to heating an electrically conductive object using electromagnetic induction. In one aspect, an induction heater passes an alternating current through an electromagnet, which causes an alternating magnetic field to penetrate the object, generating eddy currents. In a further aspect, the eddy currents heat the object. In one aspect, inductive heating is useful herein for heating graphite or other electrically conductive carbons; the heat thus generated is transferred to coal particles.

In some aspects, the processes disclosed herein are "pyrolysis" processes. As used herein, pyrolysis is the first of two heating steps used to produce a carbon foam. Prior to pyrolysis as disclosed herein, coal materials, additional agents, and the like, are mixed. Exemplary methods for mixing the coal materials and additional agents can be found in the Examples. During pyrolysis, the foam precursor components (i.e., coal particles) become heated and devolatilize, beginning to stick together. The pyrolysis process produces a "green foam" or a "soft coal." In one aspect, a green foam is a closed-cell foam. In a typical closed cell foam, cells are pressed together and air and moisture cannot enter. In one aspect, a closed cell foam is rigid and stable.

"Calcination" as used herein refers to a thermal treatment to bring about further chemical changes to the carbon foams disclosed herein. In one aspect, calcination improves stability and/or mechanical strength of the foams. In another aspect, calcination causes the foams to become electrically conductive. In one aspect, any calcination step disclosed herein can be conducted in a non-oxidizing environment. In another aspect, the calcination step can be conducted in a kiln, a microwave, an induction heater, or by another method. In one aspect, calcination is carried out at a temperature between about 900° C. and 1350° C.

A "carbohydrate syrup" as used herein is any viscous aqueous solution of sugars. In some aspects, carbohydrate syrups are useful as flux agents in the processes disclosed herein. In one aspect, the carbohydrate syrup can be high fructose corn syrup, corn syrup, honey, maple syrup, brown rice syrup, barley malt syrup, molasses, date syrup, or another natural, artificial, or semi-synthetic syrup containing freely-rotating hydroxyl groups susceptible to microwave excitation.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt %) of a component, unless specifically stated to the contrary, is based on the total weight of the formulation or composition in which the component is included.

As used herein, the terms "optional" or "optionally" means that the subsequently described event or circumstance can or cannot occur, and that the description includes instances where said event or circumstance occurs and instances where it does not.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Processes for Producing Carbon Foams

In accordance with the purpose(s) of the disclosure, as embodied and broadly described herein, the disclosure, in one aspect, relates to processes for preparation of a carbon foam material, the process comprising heating a mixture comprising a coal material and an electrically conductive carbon material and/or flux agent. In some aspects, other components may be included in the compositions, including, but not limited to, foaming pitch materials, solvents, and the like. In some aspects, the compositions disclosed herein can form a pseudo-fluid material following heating (i.e., following pyrolysis) that can be transferred to a mold and further heated to form a carbon foam, or may form a carbon foam directly after pyrolysis. In either of these aspects, the carbon foam can be further calcined to improve mechanical or electrical properties. The disclosure, in further aspects, relates to carbon foams and other materials prepared using the disclosed processes.

Coal

In one aspect, the processes disclosed herein require a coal material as a raw material for producing carbon foams. In a further aspect, the coal material is a caking coal. In a further aspect, caking properties can be measured by free swelling index and/or Gessler Plasticity. In a still further aspect, the free swelling index is between about 3.5 and about 5.0 as determined by ASTM D 720, or is about 3.5, 3.75, 4, 4.25, 4.5, 4.75, or about 5, or a combination of any of the foregoing values, or a range encompassing any of the foregoing values. In a still further aspect, the coal material is a bituminous coal. In one aspect, the bituminous coal can be a Lower Kittanning coal or bituminous coal from another source. In a further aspect, Lower Kittanning coal is a low-volatile, low-ash coal derived from a coal seam wherein the mined coal product can be used to make coke in a traditional coking oven. In some aspects, the coal material is ground prior to blending with additional starting materials. In any of these aspects, the bituminous coal can be a low-volatile bituminous coal, a high-volatile bituminous coal, or a combination thereof. In a further aspect, the level of volatiles in a coal sample can be determined in the ASTM Standard Proximate Analysis Test using, for example, a thermogravimetric analyzer.

In one aspect, coal can be received as any size particle for the disclosed process and further processed by any known means including, but not limited to, a hammer mill, a rock crusher, a mortar and pestle, or another means, to reduce the size further. In still another aspect, sieves with various mesh values can be used to separate the carbon particles into desired size ranges.

In one aspect, the coal can be provided in bulk form. Further in this aspect, the coal pieces or particles can be reduced in size prior to being used in the disclosed processes. In one aspect, for example, the coal can be milled in a hammer mill or similar apparatus until the desired particle size is achieved. In one aspect, the coal can be milled in a hammer mill until it has a particle size of from about 1 to about 5 mm, or about 1, 2, 3, 4, or about 5 mm, or a combination of any of the foregoing values, or a range encompassing any of the foregoing values. In a further aspect, the coal is milled in a hammer mill to an average particle size of 2 mm. In another aspect, after milling, coal can be fed into a coal pulverizer for further reduction in particle size. In one aspect, following pulverization, the pulverized coal can be sifted through sieves of various sizes to select coal particles having a particular size range. In another aspect, several sieve trays with different mesh sizes can be stacked and shaken together to simultaneously separate pulverized coal into several grouped portions, wherein particles within each portion have like particle sizes, but different portions have different overall particle size ranges.

In one aspect, the compositions disclosed herein include a coal material having a particle size range of between about 10 mesh and about 400 mesh. In a further aspect, the coal material has a particle size of about 10 mesh; about 15 mesh; about 20 mesh; about 25 mesh; about 30 mesh; about 35 mesh; about 40 mesh; about 45 mesh; about 50 mesh; about 55 mesh; about 60 mesh; about 65 mesh; about 70 mesh; about 75 mesh; about 80 mesh; about 85 mesh; about 90 mesh; about 95 mesh; about 100 mesh; about 105 mesh; about 110 mesh; about 115 mesh; about 120 mesh; about 125 mesh; about 130 mesh; about 135 mesh; about 140 mesh; about 145 mesh; about 150 mesh; about 155 mesh; about 160 mesh; about 165 mesh; about 170 mesh; about 175 mesh; about 180 mesh; about 185 mesh; about 190 mesh; about 195 mesh; about 200 mesh; about 205 mesh; about 210 mesh; about 215 mesh; about 220 mesh; about 225 mesh; about 230 mesh; about 235 mesh; about 240 mesh; about 245 mesh; about 250 mesh; about 255 mesh; about 260 mesh; about 265 mesh; about 270 mesh; about 275 mesh; about 280 mesh; about 285 mesh; about 290 mesh; about 295 mesh; about 300 mesh; about 305 mesh; about 310 mesh; about 315 mesh; about 320 mesh; about 325 mesh; about 330 mesh; about 335 mesh; about 340 mesh; about 345 mesh; about 350 mesh; about 355 mesh; about 360 mesh; about 365 mesh; about 370 mesh; about 375 mesh; about 380 mesh; about 385 mesh; about 390 mesh; about 395 mesh; about 400 mesh; any set or combination of the foregoing values; or any range utilizing the foregoing values to define a sub-range within about 10 mesh to about 400 mesh. In one aspect, as the mesh rating number increases, the coal particle size decreases.

Conductive Carbon Compound

In some aspects, the processes disclosed herein may include a conductive carbon compound. In one aspect the conductive carbon compound can be a carbon fiber, a carbon nanofiber, a carbon nanotube, a carbon flake, a carbon black such as, for example, acetylene black, lamp black, or furnace black, an amorphous carbon, an isotropic carbon, an anisotropic carbon, a needle coke, a graphene, a graphene oxide, a graphite, or a combination thereof. In one aspect, the particle size of the conductive carbon compound can vary based on the heating methods disclosed herein. In one aspect, when microwave energy is used in the disclosed processes, the particle size of the conductive carbon can be from about 3 µm to about 40 µm, or can be about 3, 4, 5, 10, 15, 20, 25, 30, 35, or about 40 µm, or a combination of any of the foregoing values, or a range encompassing any of the foregoing values. In an alternative aspect, when inductive field heating is used in the disclosed procedures, the particle size of the conductive carbon can be from about 3 µm to over 10 mm, or can be 3, 10, 100, or 500 µm, or 1, 2, 3, 4, 5, 6, 7, 8, 9, or 10 mm, or a combination of any of the foregoing values, or a range encompassing any of the foregoing values. In one aspect, the conductive carbon compound is graphite and has an average particle size of about 6 µm. In any of the above aspects, the conductive carbon compound can be finely ground. Without wishing to be bound by theory, for microwave heating applications, a finely ground conductive carbon compound has a higher surface area per unit volume and can thus make more extensive contact with the coal material for the purpose of heat transfer.

In one aspect, the processes disclosed herein can be classified as "high carbon," "low carbon," or "no carbon." In a further aspect, this classification indicates the weight percent of conductive carbon compound in the disclosed compositions and mixtures. In one aspect, a "high carbon" sample includes up to about 10% by weight of the conductive carbon compound. In another aspect, a "low carbon" sample includes approximately 1% by weight of the conductive carbon compound. In still another aspect, a "no carbon" sample is substantially free of conductive carbon compound. Other weight percentages of conductive carbon are also contemplated including 2%, 3%, 4%, 5%, 6%, 7%, 8%, and 9%, or a combination of any of the foregoing values, or a range encompassing any of the foregoing values. In some aspects, when a specific conductive carbon compound is used such as, for example, graphite, samples can be referred to as "high graphite," "low graphite," and the like.

In one aspect, the presence of a conductive carbon compound aids in foam formation by pyrolysis. In a further aspect, samples having about 1% conductive carbon by weight take less time to form green foam via pyrolysis than samples that are substantially free of conductive carbon. In another aspect, samples having about 5% conductive carbon by weight require less time to form green foam via pyrolysis than samples having 1% conductive carbon by weight. In another aspect, samples having about 10% conductive carbon by weight require less time to form green foam via pyrolysis than samples having 5% conductive carbon by weight. Without wishing to be bound by theory, it is believed the presence of conductive carbon assists the mixtures in reaching the temperatures required to devolatilize flux mixtures, regardless of whether high-volatile or low-volatile bituminous coal is used as the carbon source. In a further aspect, levels of conductive carbon are believed to contribute more to foam formation than different particle sizes of coal and/or different microwave power levels. In one aspect, the largest impact of increasing conductive carbon concentration on foam formation time is observed at low microwave power levels. In some aspects, foam formation can be accomplished using a conductive carbon compound as disclosed herein even when an additional agent such as, for example, a flux agent, is not used.

Without wishing to be bound by theory, the inclusion of a conductive carbon compound such as, for example, graphite, in the compositions disclosed herein additionally allows for microwave-assisted calcination of the disclosed carbon foams since the conductive carbon compounds allow the compositions to reach the desired calcination temperatures.

Additional Agent(s)

In another aspect, the processes disclosed herein are optionally carried out in the presence one or more additional agents. In a further aspect, the one or more additional agents include, but are not limited to, carbohydrate syrups, coal tar distillates, and solvents. In some aspects, an additional agent is not used. In some aspects, the additional agent is a flux agent (also referred to as a fluxing agent). In one aspect, a "flux agent" as used herein is defined as a compound or mixture of compounds that, when blended with bituminous coal, absorbs microwave energy in such a way as to heat the coal material to its pyrolysis temperature.

Flux Agent(s)

In a further aspect, when the one or more additional agents includes a flux agent, coal and flux agent can be mixed together to form a composition that can be from about 30% to about 70% by weight of coal particles, or is about 30, 35, 40, 45, 50, 55, 60, 65, or about 70% by weight of coal particles, or a combination of any of the foregoing values, or a range encompassing any of the foregoing values. In one aspect, the inherent percentage of volatile components of the coal can be a primary determinant of the flux:coal ratio. In one aspect, a high volatile bituminous coal will require a lower amount of flux agent than a low volatile bituminous coal. In another aspect, the chemical makeup of the flux agent and/or any additives used, particle size distribution of the coal, and properties of the desired final products can also affect the flux:coal ratio. As used herein, "coal flux material" refers to a mixture of coal particles and flux agent. In one aspect, coal flux material is typically viscous and semi-fluid. In one aspect, if a high enough temperature is reached and enough volatiles have been removed, a carbon foam sets as the particles fuse together. In an alternative aspect, if the coal particles begin to fuse into a foam but are still fluid, the coal flux material can be molded or extruded into various sizes and shapes.

In some aspects, the flux agent includes a secondary component such as, for example, recovered coal volatiles, a liquid product from the petroleum industry such as, for example, kerosene, or a combination thereof. In one aspect, when the flux agent includes recovered coal volatiles as a secondary component, the recovered coal volatiles have boiling points ranging from about 80° C. to about 300° C. In a further aspect, the secondary component of the flux agent is heated during pyrolysis by the primary component and alters the interaction between the primary component and the coal particles. In some aspects, the secondary component may contain phenanthrene or related compounds.

In one aspect, the additional agent and/or fluxing agent includes a carbohydrate syrup alone or in combination with a secondary component such as, for example, recovered coal volatiles as described above. Further in this aspect, when both a carbohydrate syrup and recovered coal volatiles are included in the fluxing agent, the fluxing agent is from about 92 to about 98 wt % carbohydrate syrup and from about 2 to about 8 wt % recovered coal volatiles. In one aspect, the carbohydrate syrup can be about 92, 93, 94, 95, 96, 97, or about 98 wt % of the fluxing agent and the recovered coal volatiles can be about 2, 3, 4, 5, 6, 7, or about 8 wt % of the fluxing agent, or a combination of any of the foregoing values, or a range encompassing any of the foregoing values. In another aspect, the fluxing agent is about 95% carbohydrate syrup by weight and about 5% recovered coal volatiles by weight. Further in this aspect, the mixture of coal particles and fluxing agent can include additional carbohydrate syrup that is added separately to the mixture (i.e., not part of the fluxing agent).

In one aspect, flux agent can be mixed with the coal by any suitable mechanical means including stirring. In some aspects, an initial amount of flux agent is added to the coal particles, mixing occurs, and then additional flux agent is added to the coal/flux mixture to achieve sufficient wetting of the coal particles. In one aspect, if the coal/flux mixture is particularly viscous, it can be kneaded by hand using rubber gloves or other suitable hand protection. In one aspect, homogeneous mixing of the coal/flux mixture is important to the consistent and predictable formation of carbon foam with desired properties. In one aspect, when low-volatile bituminous coal is used, the final ratio of coal particles to flux agent is from about 1:1 to 3:1, or is about 1:1, 1.5:1, 2:1, 2.5:1, or about 3:1, or a combination of any of the foregoing values, or a range encompassing any of the foregoing values. In one aspect, 50 g of flux agent is used for every 100 g of coal. Further in this aspect, initially, 30 g of flux agent is added to 100 g of coal, the sample is mixed, and then 20 g of additional flux agent is added to the coal/flux mixture.

In some aspects, carbon foam can be produced at atmospheric pressure using high volatile bituminous coal in a single heating step. Without wishing to be bound by theory, when a coal source has a higher volatile amount, a lower amount of flux agent is needed to create the pseudo-liquid state required for particle fusing during microwave radiation. In one aspect, a coal to flux ratio of about 10:1 to about 2:1 is used. In a further aspect, the coal to flux ratio is about 10:1, 9:1, 8:1, 7:1, 6:1, 5:1, 4:1, 3:1, about 2:1, or a combination of any of the foregoing values, or a range encompassing any of the foregoing values. In one aspect, the coal to flux ratio is 4:1. In some aspect, a coal to flux ratio of 4:1 is useful when the flux agent is high fructose corn syrup without added carbon conversion process volatiles. In a further aspect, a particle size of 30-50 mesh for the coal is useful herein, but other particle sizes will also work. In one aspect, larger particle sizes may lead to more consistent mixing with less time and effort required. In many aspects, when high-volatile coal is used, it is not required to knead the coal and flux mixture by hand to achieve homogeneity.

In a further aspect, the carbohydrate syrup is susceptible to microwave excitation. Further in this aspect, the carbohydrate syrup is capable of absorbing the energy band in the microwave region. In one aspect, any compound that has hydroxyl groups that are free to rotate is capable of absorbing energy of this frequency. In one aspect, it is desirable that susceptible carbohydrate molecules in the syrup would generate enough heat to fuse coal particles, while volatile compounds given off by the induced pyrolysis would cause foams to form. In one aspect, the carbohydrate syrup is high fructose corn syrup. In one aspect, carbohydrate syrups such as high fructose corn syrup are inexpensive and widely available. In a further aspect, when high fructose corn syrup is heated, it devolatilizes and forms a weak, coke-like material. In another aspect, high fructose corn syrup naturally contains from about 15% water to about 25% water, or about 15, 16, 17, 18, 19, 20, 21, 22, 23, 24, or 25% water, or a combination of any of the foregoing values, or a range encompassing any of the foregoing values. In one aspect, the high fructose corn syrup contains about 18% water. In an alternative aspect, the high fructose corn syrup contains about 21% water. When incorporated into coal flux materials as a fluxing agent and heated, in one aspect, high fructose corn syrup releases vapors, causing fused coal to rise into a foam. Further in this aspect, water vapor is eventually driven off, but the remaining high fructose corn syrup material continues to decompose, giving off heat that causes coal particles to devolatilize and form a green foam, which is porous. In one aspect, green foam has low crush strength and almost no electrical conductivity. In any of the aspects described herein, regardless of how green foam is formed and regardless of whether a carbohydrate syrup was present in the initial mixture, green foam can be calcined, a process that imparts conductivity and improves crush strength.

Coal Tars, Coal Tar Distillates, Petroleum Residues, and Pitches

In another aspect, the additional agent or fluxing agent includes a coal tar, a coal tar distillate, a petroleum residue, or a related product. In some aspects, the flux agent is a complex mixture of compounds. In one aspect, the additional agent includes a coal tar distillate such as, for example, a foaming pitch. In a further aspect, foaming pitch can be made from lignite coal or another coal form. In one aspect, to make foaming pitch, lignite coal can be ground and passed through a sieve. In a further aspect, the sieve can be 60 mesh, although the particle size can be varied without departing from the processes disclosed herein. In some aspects, the particle size is altered in order to facilitate scaling of foaming pitch production for commercial production. In another aspect, following grinding and sieving, a slurry is prepared by adding ground coal to a solvent. In one aspect, the solvent can be condensed and recycled volatiles from previous coal-processing experiments and/or industrial processes. In still another aspect, hydrogenated vegetable oil can also be added to the mixture. In one aspect, and without wishing to be bound by theory, hydrogenated vegetable oil can act as a hydrogen donor during the pitch conversion reaction. In one aspect, the ratio of coal to solvent is from about 1:1 to about 1:3, or is about 1:1, 1.5:1, 2:1, 2.5:1, or about 3:1, or a combination of any of the foregoing values, or a range encompassing any of the foregoing values. In one aspect, for 15 lbs of coal, 42 lbs of solvent are required. In another aspect, the ratio of coal to hydrogenated vegetable oil is from about 10:1 to about 1:1, or is about 10:1, 9:1, 8:1, 7:1, 6:1, 5:1, 4:1, 3:1, 2:1, or 1:1, or a combination of any of the foregoing values, or a range encompassing any of the foregoing values. In one aspect, for 15 lbs of coal, 3 lbs of hydrogenated vegetable oil are used.

In another aspect, a slurry formed from coal, solvent, and vegetable oil is transferred into a reaction vessel of appropriate size. In a further aspect, the reaction vessel is capable of maintaining homogeneity in the mixture throughout the disclosed process. In some aspects, the slurry is heated to a temperature of from about 105° C. to about 130° C., or about 105, 110, 115, 120, 125, or about 130° C., or a combination of any of the foregoing values, or a range encompassing any of the foregoing values. In one aspect, the slurry is heated to a temperature of 120 \] degree. Further in this aspect, heating of the slurry allows water and other low boiling point volatiles to vaporize. In some aspects, these vapors can be vented to a moisture collection vessel and removed from the reaction mixture.

Once low boiling point volatile compounds have been driven off, in some aspects, the reaction vessel is then isolated and the temperature increased. In a further aspect, the temperature is increased to from about 450° C. to about 650° C., or about 450, 500, 550, 600, or about 650° C., or a combination of any of the foregoing values, or a range encompassing any of the foregoing values. In one aspect, the temperature is increased to about 550° C. In a further aspect, increasing the temperature of the reaction vessel may lead to an increase in pressure as higher boiling point volatiles are driven off. In one aspect, pressure in the vessel is maintained between about 400 to about 700 psig, or at about 400, 450, 500, 550, 600, 650, or about 700 psig, or a combination of any of the foregoing values, or a range encompassing any of the foregoing values. In one aspect, pressure in the vessel is maintained between 500 and 600 psig with venting as necessary to maintain the pressure range. In some aspects, excess volatiles escaping at high temperatures are allowed to flow from the reaction vessel into an expansion tank. In a further aspect, compounds in the expansion tank can be later cooled and recycled back into the solvent mixture useful in the processes disclosed herein. In some aspects, non-condensable gases are formed. In a further aspect, these non-condensable gases can be vented to a scrubber to prevent environmental release. In one aspect, the non-condensable gases include hydrogen sulfide. In one aspect, heating at increased pressure is conducted for from about 30 minutes to about 90 minutes, or for about 30, 45, 60, 75, or about 90 minutes, or a combination of any of the foregoing values, or a range encompassing any of the foregoing values. In one aspect, heating at increased pressure is conducted for one hour.

In one aspect, when the reaction is complete, the reaction vessel can be vented to release pressure. In another aspect, when the reaction is finished, a low-softening point mixture remains in the reaction vessel. In some aspects, this low-softening point mixture contains a quantity of ash that must be removed (i.e. "de-ashing") prior to further use. Still further in this aspect, the low-softening point mixture can be transferred into another vessel to cool. In a further aspect, cooling is required prior to centrifugation due to instrument limitations. In one aspect, the low-softening point mixture contains reacted coal and mineral matter. In a further aspect, following cooling, this mixture can be further separated, by a method such as, for example, centrifugation. In one aspect, centrifugation occurs in a flow-driven centrifuge. Further in this aspect, ash from the low-softening point mixture can be collected in a rotating spindle in the centrifuge. Still further in this aspect, depending on the properties of the coal used as a starting material, the ash may be enriched in rare earth elements (REEs) and may be further refined. In an alternative aspect, de-ashing can be accomplished using filtration.

The low-softening point mixture is, in some aspects, further distilled following the de-ashing process. In one aspect, distillation can be carried out in a vacuum distillation apparatus with a vacuum level of from about 25 to about 100 torr, or of about 25, 30, 35, 40, 45, 50, 55, 60, 65, 70, 75, 80, 85, 90, 95, or about 100 torr, or a combination of any of the foregoing values, or a range encompassing any of the foregoing values. In one aspect, the vacuum level is about 50 torr. In another aspect, distillation can be carried out at a temperature of from about 260° C. to about 300° C., or at about 260, 265, 270, 275, 280, 285, 290, 295, or about 300° C. In one aspect, distillation of the pitch mixture is carried out at 280° C. In some aspects, the vacuum distillation apparatus is equipped with a low flow rate nitrogen sparge to facilitate the flow and removal of volatiles from the pitch. In another aspect, and without wishing to be bound by theory, the nitrogen sparge may facilitate orientation of various moieties in the carbon pitch as it forms. In one aspect, the distillation system is equipped with collection vessels and condensers in parallel to collect fractions from the distillation. In some aspects, these fractions have commercial value. In another aspect, the pitch can be drained from the distillation column as a liquid at elevated temperature and allowed to cool to room temperature, at which point it solidifies. In one aspect, the low softening point mixture, after this process, has an increased softening point and can, in some aspects, be referred to as "pitch" at this point if it is solid at room temperature. In another aspect, the low softening point mixture or pitch is free of material that is insoluble in quinolone (i.e., "quinolone insoluble free"). Further in this aspect, quinolone insoluble free material such as the low softening point mixture or pitch can be used in the production of carbon fibers.

In any of the above aspects, following the devolatilization step, the pitch can be removed from the coking vessel. Further in this aspect, the pitch is in the form of hard pieces ranging in size from roughly 0.5 to 8 cm. In one aspect, the larger pieces can be crushed by any known means such as with a hand-operated rock crusher. In another aspect, smaller pieces can also be crushed by any known means, such as using a mortar and pestle. Following crushing and/or grinding, the pitch particles can be separated into size fractions using sieve trays. In one aspect, the sieve trays are stacked into a series such that larger particles are maintained on the top tray while smaller particles fall through successive trays, with the smallest particles landing on a collection tray at the bottom of the stack of trays. In some aspects, the particle sizes are ranges (i.e., 20-50 mesh, 50-100 mesh, and >100 mesh) but any size range desired can be selected by the operator as needed. In any of the above aspects, when particles become compacted, they can be scraped off the trays and further crushed using a rock crusher or mortar and pestle as appropriate.

Lignin-Based Materials

In one aspect, the additional agent or fluxing agent includes a lignin-based material. In one aspect, large quantities of lignin-based materials are currently produced as waste products in the paper industry and related industries, particularly from the pulping process. One lignin-based waste material is "black liquor" and typically contains lignin residues, hemicellulose, and inorganic paper processing chemicals. Black liquor has approximately 15% solids by weight and is typically burned due to its lack of commercial or industrial value. In some aspects, sodium lignosulfonate can be synthesized from components of black liquor or other paper and/or wood industry byproducts. In one aspect, the additional agent or fluxing agent contains sodium lignosulfonate and is or is derived from black liquor or another paper industry waste.

Solvents

In still another aspect, the additional agent includes a solvent. In one aspect, the solvent is kerosene, NMP, or a mixture thereof. In another aspect, the solvent can be recovered volatiles from the processes disclosed herein, as described previously. In a further aspect, when the solvent is NMP, the NMP can be from about 20 to about 50% by weight of the mixture, or can be about 20, 25, 30, 35, 40, 45, or about 50% by weight of the mixture, or a combination of any of the foregoing values, or a range encompassing any of the foregoing values. In one aspect, the NMP is present in an amount of about 35% by weight of the mixture. In some aspects, when NMP or kerosene or another solvent is present, no carbohydrate syrup or flux mixture is required. In one aspect, NMP or another solvent can solubilize volatile material from coal but must be removed prior to foaming or pyrolysis. In some aspects, graphite can be added to the NMP. Further in these aspects, during microwave heating, the graphite can increase in temperature to a point where NMP can be distilled while simultaneously devolatilizing the coal.

Homogenization of Coal Flux Material

In one aspect, in order to produce a carbon foam with a consistent composition and the desired properties using the methods disclosed herein, it is first necessary to produce a homogeneous mixture. In one aspect, when preparing a coal flux material as disclosed herein, the mixture of coal particles and flux agent must be homogeneous. In one aspect, this requires that the surface of all coal particles must be uniformly wetted with the flux agent in order for proper fusion into a carbon foam. In many aspects, the coal flux material is a high viscosity substance and intensive mixing is thus required. In one aspect, when an additional agent is used in the methods disclosed herein, the conductive carbon and the additional agent are first mixed or blended, followed by the addition of the coal material. In an alternative aspect, the conductive carbon and/or the additional agent such as a flux agent can be added incrementally while coal particles are agitated.

In one aspect, following homogenization of the coal flux material, the coal flux is prepared for the foaming step. In a further aspect, the coal flux material is placed into a container and compressed to remove any void spaces or air pockets. In one aspect, the container is made from a ceramic material. In some aspects, a release agent is applied to the container prior to adding the coal flux material. Further in this aspect, the release agent aids in the removal of the final carbon foam product by preventing it from sticking or binding to the container. In another aspect, the release agent can be a natural oil, such as a cooking oil. In some aspects, the release agent is provided in spray form.

In another aspect, additional materials can also be added to the coal flux material at this time. In one aspect, carbon fibers can be added to add strength to the foam material, alter its conductive properties, or both. In some aspects, the coal flux material can be layered and additional volatile additives can be placed between the layers to create $sp^2$ hybridized carbon layers within the final foam product. In another aspect, the additional materials can include, but are not limited to, previously made foam particles, carbon micro- and nanoparticles, carbon micro- and nanofibers, diamond powder, graphene and/or graphene oxide particles, graphite, and/or graphite flakes can be added to create composite carbon foams. In another aspect, composite foams can be produced by layering foams with different coal flux materials prepared from different feedstocks. In still another aspect, composite foams can be produced by using coal flux materials with different particle sizes.

Heating Methods Useful Herein

In one aspect, when subjected to microwave energy, conductive carbon materials quickly increase in temperature. In a further aspect, conductive carbon materials absorb microwave energy via eddy current heating. In another aspect, conductive carbon materials may absorb radio waves as in, for example, inductive heating. In one aspect, either microwave heating or inductive heating can be used in the processes disclosed herein.

In one aspect, microwave heating can be conducted in a household microwave oven or another microwave apparatus with a frequency range that matches or overlaps with that of a household microwave oven. In some aspects, a household microwave oven has a frequency range that is essentially monochromatic with a maximum amplitude in the —OH rotation range. In another aspect, a microwave oven or apparatus can be tuned to match rotation energies of other functional groups. Further in this aspect, tuning a microwave oven to a different frequency would enable the selection and use of different flux materials, which could, in turn, affect the final properties of any carbon foams produced. In one aspect, when the flux agent is or contains coal tars, petroleum residues, and the like, a household microwave may not be used and a different, tunable microwave or a microwave apparatus tuned to a different frequency may instead be employed in the disclosed processes.

In one aspect, the processes disclosed herein are conducted in a household microwave oven or another microwave apparatus with preprogrammed power settings. In another aspect, such a microwave oven or apparatus is capable of heating at different power settings. In one aspect, a high power setting (e.g., 100% power) is subjected to microwave power for the entire heating time. In another aspect, a medium or middle power setting (e.g., 50% power) involves power cycles. Further in this aspect, if a sample is heated at 50% power for 1 minute, the sample is exposed to radiation repeating intervals of 10 seconds on, 10 seconds off, or the like, until total cycle time reaches the programmed microwave time.

In another aspect, when subjected to microwave energy, some additional agents such as, for example, carbohydrate syrups are subject to dielectric heating when exposed to microwave energy.

In another aspect, shrinkage of foam during calcination may cause defects in the foam and the defects may, in turn, lead to foam failure. Without wishing to be bound by theory, defects and shrinkage may be due to nonlinear heating; that is, foams are heated at the surface and in the interior at unequal rates, since the foams are thermal insulators. In some aspects, inclusion of graphite or another conductive carbon material uniformly throughout the foam should lead to uniform heating with low shrinkage levels and thus no or low distortion and strain. Further in these aspects, however, the inclusion of conductive carbon compounds may cause the entire foam sample to become electrically conductive and can, in some cases, lead to sparking in the system.

In some aspects, inductive heating can be used instead of or in addition to microwave heating for calcination. Further in this aspect, manufactured carbon foam samples are placed into a space between the coils in an inductive heater, which can be turned on for an appropriate time based on the power level and sample size. In one aspect, inductive heating takes place in one or more 30 second intervals. Further in this aspect, calcination can be considered complete when conductivity of the carbon foams as measured by a multimeter ceases to increase. In one aspect, calcination using inductive heating completes quickly due to the depth of penetration of the inductive fields into the carbon foam samples.

In either of the above aspects, regardless of the energy source or heating mechanism, when conductive carbon materials and/or additional agents are exposed to microwave or inductive heating, these conductive carbon materials and/or additional agents then transfer heat to the coal materials disclosed herein.

In one aspect, after the processes disclosed above are completed, a green foam-like product is produced. In a further aspect, although this product has some mechanical strength, a further calcination step can improve this and related properties. In one aspect, green foam-like foam is removed from the container in which it has been heated. In a further aspect, the surface of this initial foam may have some cracking or other defects.

Initial Heating Step

In one aspect, prior to calcination, samples are subjected to an initial heating step. In a further aspect, coal compositions (i.e., coal/flux mixtures and/or mixtures containing coal and conductive carbon compounds) can be placed into a ceramic cup or crucible as required by the sample size.

In one aspect, crucible or cub loading can be accomplished by placing a sufficient amount of coal/flux, coal/graphite, or other mixtures disclosed herein to cover the bottom of the container and roughly fill the container. In a further aspect, the mixture can then be compressed by hand and additional amounts of the mixture added until the container is filled. In a further aspect, the top of the material can be scraped with a flat object to remove excess material. In any of the above aspects, the crucible or cup can then be weighed to determine how much foam precursor has been loaded into the crucible or cup.

In a further aspect, the container used was previously coated with a release agent such as, for example, a vegetable oil spray. In another aspect, after the containers are filled with coal samples, the containers are covered, either with a ceramic tile or crucible lid as appropriate for the container being used. In one aspect, the samples thus prepared are placed into a microwave. In some aspects, a home microwave oven is used. In other aspects, a commercial microwave device can be used. In either of these aspects, the microwave oven is closed, a power level is chosen as discussed previously, and a time increment is selected. In one aspect, the time increment is from about 30 seconds to about 15 minutes, or is about 30 seconds, 60 seconds, 90 seconds, 2 minutes, 2 minutes 30 seconds, 3 minutes, 3 minutes 30 seconds, 4 minutes, 4 minutes 30 seconds, 5 minutes, 5 minutes 30 seconds, 6 minutes, 6 minutes 30 seconds, 7 minutes, 7 minutes 30 seconds, 8 minutes, 8 minutes 30 seconds, 9 minutes, 9 minutes 30 seconds, 10 minutes, 10 minutes 30 seconds, 11 minutes, 11 minutes 30 seconds, 12 minutes, 12 minutes 30 seconds, 13 minutes, 13 minutes 30 seconds, 14 minutes, 14 minutes 30 seconds, or about 15 minutes, or a combination of any of the foregoing values, or a range encompassing any of the foregoing values. After a heating cycle is completed, in one aspect, the heated sample is removed from the microwave chamber and inspected. In some aspects, the samples rose during heating. Further in these aspects, samples that had risen were compressed and additional heating cycles were performed until the samples solidified and rising was not observed.

In some aspects, samples were microwaved in a crucible that had been placed inside a glass beaker covered with a watch glass. In these aspects, this arrangement allowed for the release of volatile compounds. In a further aspect, volatile compounds condensed on the beaker and/or watch glass and could be collected for later analysis.

Following microwave heating, in one aspect, some microwaved samples were observed to be outwardly bulging. Without wishing to be bound by theory, it is believed that the bulging portion was formed as volatile components escaped from the foam; thus, the carbon foam and the bulging portion are malleable and can be molded or shaped. Again, without wishing to be bound by theory, it is believed that the carbon material occupies a pseudo-fluid state at high temperatures and does not form a solid foam until cooling. In one aspect, then, it is possible to mold or extrude a partially formed carbon foam into a specific size or shape.

In one aspect, swelling of the samples can be reduced by heating the samples to an elevated temperature to drive off moisture and low boiling point volatiles prior to the first microwave heating step. In one aspect, the samples can be heated to a temperature of from about 100 to about 120° C., or to about 100, 105, 110, 115, or about 120° C., or a combination of any of the foregoing values, or a range encompassing any of the foregoing values. In one aspect, the samples can be heated to 105° C. prior to the first microwave step.

In any of the above aspects, samples formed after the initial microwave stage are placed into ceramic crucibles for calcination.

Calcination Step

In one aspect, calcination can be carried out in an inert or reducing environment. In various aspects, the non-oxidizing atmosphere used in the calcining step can comprise oxygen present in an amount less than or equal to about 10% (v/v); about 9% (v/v); about 8% (v/v); about 7% (v/v); about 6% (v/v); about 5% (v/v); about 4% (v/v); about 3% (v/v); about 2.5% (v/v); about 2% (v/v); about 1.5% (v/v); about 1% (v/v); about 0.5% (v/v); a percentage (v/v) of oxygen value or set of percentage of oxygen values within any of the foregoing ranges of percentage of oxygen values; or a range of percentage of oxygen values that is a sub-range of the foregoing ranges of percentage of oxygen values. In a further aspect, the non-oxidizing atmosphere in the calcining step is essentially oxygen free.

In various aspects, the non-oxidizing atmosphere used in the calcining step can comprise one or more inert gases; and wherein the inert gas is argon, nitrogen, or a mixture of both in an amount that is greater than about 70% (v/v). In a further aspect, the amount of inert gas in the non-oxidizing atmosphere comprises greater than about 75% (v/v); about 80% (v/v); about 85% (v/v); about 90% (v/v); about 95% (v/v); about 96% (v/v); about 97% (v/v); about 98% (v/v); about 99% (v/v); a percentage (v/v) value of inert gas or set of percentage (v/v) of values of inert gas within any of the foregoing ranges of inert gas values; or a range of percentage of inert gas values that is a sub-range of the foregoing ranges of percentage of inert gas values.

Furnace Calcination

In other aspects, calcination can be conducted with samples placed in closed crucibles under graphite chips and several layers of steel wool. Without wishing to be bound by theory, the steel wool acts as an initial oxygen scavenger and the graphite chips are believed to oxidize to $CO_2$ upon introduction of oxygen, thus removing any oxygen from the atmosphere before it reaches the carbon foam samples. In a further aspect, when graphite and steel wool are used to scavenge oxygen, no purges or flows of inert gas are required to maintain an inert or reducing environment. In one aspect, the graphite chips have an average particle size of from about 0.5 mm to about 4 mm, or of about 0.5, 1, 1.5, 2, 2.5, 3, 3.5, or about 4 mm, or a combination of any of the foregoing values, or a range encompassing any of the foregoing values. In one aspect, the graphite chips have an average particle size of about 2 mm. Exemplary procedures for using graphite chips and steel wool as oxygen scavengers are provided in the examples. Without wishing to be bound by theory, it is believed that heating foam samples in an oxidizing environment would lead to combustion of the green foams, resulting in the production of ash rather than of stable carbon foams.

In one aspect, calcination can be carried out in a furnace. Further in this aspect, calcination can be carried out in a steel box or a ceramic bowl with a cover such as, for example, a ceramic tile. In either of these aspects, green foam pieces are placed in crucibles with appropriately sized lids and buried with graphite chips. Further in these aspects, several layers of steel wool can be added to the top of the box or bowl. In any of these aspects, after the addition of steel wool, the box or bowl can be closed and placed in a muffle furnace.

In some aspects, two heating steps can be employed. Further in these aspects, the foams can be inspected between heating steps. In one aspect, the furnace is programmed as follows:
 (a) the temperature is increased from room temperature at an initial rate to a first temperature;
 (b) the rate is decreased to a second rate until a second temperature is reached;
 (c) the temperature is held at the second temperature for a first time;
 (d) the furnace is turned off and allowed to cool for a second time.

In one aspect, the initial rate is from about 150 to about 250° C. per hour, or is about 150, 175, 200, 225, or about 250° C. per hour, or a combination of any of the foregoing values, or a range encompassing any of the foregoing values. In one aspect, the initial rate is about 200° C. per hour. In another aspect, the first temperature is from about 300 to about 500° C., or is about 300, 325, 350, 375, 400, 425, 450, 475, or about 500° C., or a combination of any of the foregoing values, or a range encompassing any of the foregoing values. In one aspect, the first temperature is about 400° C. In yet another aspect, the second rate is from about 50 to about 150° C. per hour, or is about 50, 75, 100, 125, or about 150° C. per hour, or a combination of any of the foregoing values, or a range encompassing any of the foregoing values. In one aspect, the second rate is about 100° C. per hour. In another aspect, the second temperature is from about 500 to about 700° C., or is about 500, 525, 550, 575, 600, 625, 650, 675, or about 700° C., or a combination of any of the foregoing values, or a range encompassing any of the foregoing values. In one aspect, the second temperature is 600° C. In still another aspect, the first time is from 2 to 4 hours, or is 2 hours, 2.25 hours, 2.5 hours, 2.75 hours, 3 hours, 3.25 hours, 3.5 hours, 3.75 hours, or about 4 hours, or a combination of any of the foregoing values, or a range encompassing any of the foregoing values. In one aspect, the first time is 4 hours. In another aspect, the second time is from 6 to 14 hours, or is about 6, 7, 8, 9, 10, 11, 12, 13, or about 14 hours, or a combination of any of the foregoing values, or a range encompassing any of the foregoing values. In one aspect, the second time is 10 hours.

In another aspect, a second heat treatment can be performed to drive off additional volatile components, increase the carbon content of the foam, and increase the strength and crush resistance of the foam. Further in this aspect, foam samples are placed into crucibles and covered with lids, and the crucibles are then covered with graphite chips and steel wool as previously described. Still further in this aspect, the steel box or ceramic bowl containing the crucibles is covered and placed back into the furnace and the following heating program is used for the furnace:

(a) the furnace is heated at a third rate until a third temperature is reached;
(b) the heating rate is reduced to a fourth rate until a fourth temperature is reached;
(c) the heating rate is reduced to a fifth rate until a fifth temperature is reached;
(d) the heating rate is reduced to a sixth rate until a sixth temperature is reached;
(e) the temperature is held at the sixth temperature for a third time period;
(f) the furnace is turned off and allowed to cool for a fourth time period.

In one aspect, the third rate is from about 400 to about 600° C. per hour, or is about 400, 425, 450, 475, 500, 525, 550, 575, or about 600° C. per hour, or a combination of any of the foregoing values, or a range encompassing any of the foregoing values. In one aspect, the third rate is 500° C. per hour. In another aspect, the third temperature is from about 300 to about 500° C., or is about 300, 325, 350, 375, 400, 425, 450, 475, or about 500° C., or a combination of any of the foregoing values, or a range encompassing any of the foregoing values. In one aspect, the third temperature is 400° C. In one aspect, the fourth rate is from 50 to 150° C. per hour, or is 50, 75, 100, 125, or about 150° C. per hour, or a combination of any of the foregoing values, or a range encompassing any of the foregoing values. In one aspect, the fourth rate is 100° C. per hour. In one aspect, the fourth temperature is from about 450° C. to about 650° C., or is about 450, 475, 500, 525, 550, 575, 600, 625, or about 650° C., or a combination of any of the foregoing values, or a range encompassing any of the foregoing values. In one aspect, the fourth temperature is 550° C. In another aspect, the fifth rate is from about 20 to about 80° C. per hour, or is about 20, 30, 40, 50, 60, 70, or about 80° C. per hour, or a combination of any of the foregoing values or a range encompassing any of the foregoing values. In one aspect, the fifth rate is about 50° C. per hour. In one aspect, the fifth temperature is about 600, 625, 650, 675, 700, 725, 750, 775, or about 800° C., or a combination of any of the foregoing values or a range encompassing any of the foregoing values. In one aspect, the fifth temperature is 700° C. In still another aspect, the sixth rate is from about 15 to about 35° C. per hour, or is about 15, 20, 25, 30, or about 35° C. per hour, or a combination of any of the foregoing values, or a range encompassing any of the foregoing values. In one aspect, the sixth rate is about 25° C. per hour. In another aspect, the sixth temperature is from about 800 to about 1350° C., or is about 800, 825, 850, 875, 900, 925, 950, 975, 1000, 1025, 1050, 1075, 1100, 1125, 1150, 1175, 1200, 1225, 1250, 1275, 1300, 1325, or 1350° C., or a combination of any of the foregoing values, or a range encompassing any of the foregoing values. In one aspect, the sixth temperature is about 900° C. In another aspect, the third time period is from about 30 minutes to about 90 minutes, or is 30, 45, 60, 75, or about 90 minutes, or a combination of any of the foregoing values, or a range encompassing any of the foregoing values. In one aspect, the third time period is 60 minutes. In another aspect, the fourth time period is from about 8 hours to about 16 hours, or is 8, 9, 10, 11, 12, 13, 14, 15, or about 16 hours, or a combination of any of the foregoing values, or a range encompassing any of the foregoing values. In one aspect, the fourth time period is about 12 hours.

In one aspect, furnace calcination can be accomplished in a single step. Further in this aspect, the furnace can be programmed by an initial quick ramp to a first temperature and then slower heating at a first rate to a second temperature, followed by holding the samples for a first time period at the second temperature. Following heating, in this aspect, the samples are then allowed to cool to room temperature.

In a further aspect, the first temperature can be between about 450 and about 650° C., or can be about 450, 475, 500, 525, 550, 575, 600, 625, or about 650° C., or a combination of any of the foregoing values, or a range encompassing any of the foregoing values. In one aspect, the first temperature is about 550° C. In another aspect, the first rate can be from about 55 to about 95° C. per hour, or can be about 55, 60, 65, 70, 75, 80, 85, 90, or about 95° C. per hour, or a combination of any of the foregoing values, or a range encompassing any of the foregoing values. In one aspect, the first rate is 75° C. per hour. In yet another aspect, the second temperature is from about 800 to about 1350° C., or is about 800, 825, 850, 875, 900, 925, 950, 975, 1000, 1025, 1050, 1075, 1100, 1125, 1150, 1175, 1200, 1225, 1250, 1275, 1300, 1325, or 1350° C., or a combination of any of the foregoing values, or a range encompassing any of the foregoing values. In one aspect, the second temperature is 900° C. In still another aspect, the first time period is from about 1 to about 5 hours, or is 1, 2, 3, 4, or about 5 hours, or a combination of any of the foregoing values, or a range encompassing any of the foregoing values. In one aspect, the first time period is about 4 hours.

In either of the above aspects, following calcination, carbon foam weight and electrical conductivity can be determined. In one aspect, a typical piece of carbon foam contracts by from about 10 to about 50 vol % during calcination, or by about 10, 20, 30, 40, or about 50 vol % during calcination, or a combination of any of the foregoing values or a range encompassing any of the foregoing values. In one aspect, the carbon foam contracts by about 30 vol % during calcination.

In some aspects, following calcination, a typical piece of carbon foam becomes harder, stronger, and more electrically conductive. In some aspects, when heating is not uniform, contraction of the foam can cause internal strains which may result in the formation of cracks in some instances.

Microwave-Assisted Calcination

In some aspects, microwave-assisted calcination was implemented. In one aspect, microwave-assisted calcination was especially useful for samples containing a conductive carbon compound. In a further aspect, microwave-assisted calcination was useful in addressing the issue of internal strains and cracks as discussed previously. In some aspects, non-calcined foam samples with a conductive carbon compound can be heated in a microwave in intervals until a specific exposure time has been reached. In one aspect, the intervals can be from about 1 to about 10 minutes long, or were 1, 2, 3, 4, 5, 6, 7, 8, 9, or about 10 minutes long, or a combination of any of the foregoing values, or a range encompassing any of the foregoing values. In one aspect, the intervals can be about 5 minutes long. In another aspect, the exposure time is from about 30 minutes to about 90 minutes, or is 30, 45, 60, 75, or about 90 minutes, or a combination of any of the foregoing values, or a range encompassing any of the foregoing values. In one aspect, the exposure time is about one hour. In a further aspect, after the microwave-assisted procedure, the samples possess electrical conductivity. In one aspect, finding electrical conductivity in a carbon foam sample is indicative of calcination having occurred. In another aspect, microwave calcination must take place in a non-oxidizing environment. Further in this aspect, the microwave chamber can be equipped to allow flow of an inert gas such as, for example, argon, nitrogen, or helium through the microwave chamber during the microwave-assisted calcination step.

Inductive Field Calcination

In other aspects, an inductive field calcination process was attempted. In some aspects, during microwave-assisted calcination, samples containing conductive carbon species sparked due to high conductive carbon content and, without wishing to be bound by theory, it was believed that inductive field heating would avoid the sparking problems but still successfully result in calcination of the carbon foams. Further in this aspect, a carbon foam sample is placed between the coils of an inductive coil heater (also known as an induction heater). After a specified interval, in some aspects, the sample can be removed and tested for conductivity. In one aspect, the interval is from 10 seconds to one minute, or is 10, 20, 30, 40, 50, or about 60 seconds, or a combination of any of the foregoing values, or a range encompassing any of the foregoing values. In one aspect, the interval is 30 seconds. In any of these aspects, following the heating interval, the sample is removed from the heater and tested for conductivity. In one aspect, when an increase in conductivity was detected, it was concluded that calcination of the foam had occurred. In a further aspect, if calcination had not yet occurred based on electrical conductivity measurements, the inductive field heating process could be repeated as needed.

In another aspect, inductive field calcination is carried out in a non-oxidizing environment. In one aspect, the inductive field heater used for inductive field calcination can be equipped to allow flow of an inert gas through the heater during calcination. In another aspect, the inductive field heater used for inductive field calcination can be placed in a chamber such as, for example, a glove box or isolation chamber that is filled with an inert gas such as, for example, nitrogen, argon, or helium.

In one aspect, following microwave radiation heat treatment to produce green foam, the coke samples can be placed in crucibles and covered in graphite and steel wool as previously described. In a further aspect, the vessel containing the crucibles and graphite is placed in a furnace, which has been programmed as follows:
(a) the furnace is heated at a first rate until a first temperature is reached;
(b) the heating rate is decreased to a second rate until a second temperature is reached;
(c) the heating rate is decreased to a third rate until a third temperature is reached;
(d) the temperature is held at the third temperature for a first time period;
(e) the heating rate is decreased to a fourth rate until a fourth temperature is reached;
(f) the temperature is held at the fourth temperature for a second time period; and
(g) the furnace is turned off and its contents are allowed to cool for a third time period.

In one aspect, the first rate is from about 300 to about 500° C. per hour, or is about 300, 325, 350, 375, 400, 425, 450, 475, or about 500° C. per hour, or a combination of any of the foregoing values, or a range encompassing any of the foregoing values. In one aspect, the first rate is about 400° C. per hour. In another aspect, the first temperature is from about 450 to about 650° C., or is about 450, 475, 500, 525, 550, 575, 600, 625, or about 650° C., or a combination of any of the foregoing values, or a range encompassing any of the foregoing values. In one aspect, the first temperature is about 550° C. In another aspect, the second rate is from about 50 to about 150° C. per hour, or is about 50, 60, 70, 80, 90, 100, 110, 120, 130, 140, or about 150° C. per hour, or a combination of any of the foregoing values, or a range encompassing any of the foregoing values. In one aspect, the second rate is about 100° C. per hour. In another aspect, the second temperature is from about 600 to about 800° C., or is about 600, 625, 650, 675, 700, 725, 750, 775, or about 800° C., or a combination of any of the foregoing values, or a range encompassing any of the foregoing values. In one aspect, the second temperature is about 700° C. In yet another aspect, the third rate is from about 10 to about 90° C. per hour, or is about 10, 20, 30, 40, 50, 60, 70, 80, or about 90° C. per hour, or a combination of any of the foregoing values, or a range encompassing any of the foregoing values. In one aspect, the third rate is about 50° C. per hour. In still another aspect, the furnace is held at the third temperature for a period of about 30 to about 90 minutes, or for about 30, 45, 60, 75, or about 90 minutes, or a combination of any of the foregoing values, or a range encompassing any of the foregoing values. In one aspect, the furnace is held at the third temperature for about 60 minutes. In another aspect, the fourth rate is from about 15 to about 35° C. per hour, or is about 16, 20, 25, 30, or about 35° C. per hour, or a combination of any of the foregoing values, or a range encompassing any of the foregoing values. In one aspect, the fourth rate is about 25° C. per hour. In yet another aspect, the fourth temperature is from about 800 to about 1350° C., or is about 800, 825, 850, 875, 900, 925, 950, 975, 1000, 1025, 1050, 1075, 1100, 1125, 1150, 1175, 1200, 1225, 1250, 1275, 1300, 1325, or 1350° C., or a combination of any of the foregoing values or a range encompassing any of the foregoing values. In one aspect, the fourth temperature is about 900° C. In one aspect, the second time period is from about 1 hour to about 3 hours, or is about 1 hour, 1.5 hours, 2 hours, 2.5 hours, or about 3 hours, or a combination of any of the foregoing values, or a range encompassing any of the foregoing values. In one aspect, the second time period is 2 hours. In another aspect, the third time period is from about 8 to about 16 hours, or is about 8, 9, 10, 11, 12, 13, 14, 15, or about 16 hours, or a combination of any of the foregoing values, or a range encompassing any of the foregoing values. In one aspect, the third time period is about 12 hours. In any of the above aspects, following calcination, samples can be assessed for conductivity using a voltmeter, with the presence of conductivity indicating successful calcination.

Alternative Feedstocks

In one aspect, alternative materials (i.e., not caking coals) can be used as source materials for carbon foams. In one aspect, a foaming pitch derived from non-caking coal as described previously can be used as a feedstock for a carbon foam. In one aspect, when foaming pitch is used as a feedstock, any particle size range can be used. In some aspects, a particle size range of 30-50 mesh is useful and can be prepared as described previously. In another aspect, a ratio of from about 10:1 to about 1:1 of pitch:flux can be used. In still another aspect, the ratio is about 10:1, 9:1, 8:1, 7:1, 6:1, 5:1, 4:1, 3:1, 2:1, or about 1:1, or a combination of any of the foregoing values, or a range encompassing any of the foregoing values. In one aspect, the ratio of pitch:flux is about 6:1. In another aspect, any flux agent already described can be useful herein. In one aspect, the flux agent can be composed of high fructose corn syrup and recycled coal volatiles as described previously. In another aspect, foaming pitch can be mixed with a conductive carbon compound as disclosed herein, prior to the formation of green foam. In any of the above aspects, the pitch and flux can be mixed by any method disclosed herein until the mixture is homogeneous. Following mixing, in one aspect, the mixture can be added to a crucible and converted to carbon foam. In one aspect, the mixture forms a carbon foam after 5 min at 20% power. In a further aspect, foams prepared from pitch feedstocks can be calcined in a non-oxidizing environment as previously described.

Process Scale Up

In one aspect, larger samples can be prepared. In a further aspect, preparation of larger samples can be useful for industrial scale up for testing and further applications. In one aspect, a sample containing coal powder, high fructose corn syrup, and graphite can be used to fill a container approximately 1 square foot in surface area. In another aspect, larger samples can be placed in larger microwave chambers to form the green foam phase. In some aspects, rather than having a rotating plate as in home microwave ovens, the microwave may have a rotating coil in order to effectively expose the sample consistently to microwave radiation. In any of these aspects, carbon foam samples can be successfully generated on a larger scale.

In one aspect, a continuous carbon foam processing system can be employed to assist in the scale-up of the processes disclosed herein. In a further aspect, this device would supply energy to the foaming mixture to achieve foam formation and/or calcination. In one aspect, the energy can be microwave energy. In another aspect, the energy can be inductive field energy. In some aspects, the device can operate intermittently with mechanical pressure to compress the carbon foam as it is processed.

Properties of Carbon Foams

In any of the above aspects, density and electrical resistivity of low-volatile and/or high-volatile bituminous coal-based carbon foams can be assessed following foam formation. In one aspect, a low-volatile bituminous coal can have a density from about 1 to about 1.5 g/mL, or can have a density of about 1.1, 1.2, 1.3, 1.4, or about 1.5 g/mL or a combination of any of the foregoing values or a range encompassing any of the foregoing values. In one aspect, a carbon foam prepared from a low-volatile bituminous coal has a density of about 1.151 g/mL. In another aspect, a carbon foam prepared from a low-volatile bituminous coal has an electrical resistivity of from about 0.1 to about 0.5 $\Omega/ft^2$, or can have an electrical resistivity of about 0.1, 0.15, 0.2, 0.25, 0.3, 0.35, 0.4, 0.45, or about 0.5 $\Omega/ft^2$, or a combination of any of the foregoing values, or a range encompassing any of the foregoing values. In one aspect, a carbon foam prepared from a low-volatile bituminous coal has an electrical resistivity of about 0.138 $\Omega/ft^2$. In still another aspect, a carbon foam prepared from a high-volatile bituminous coal can have a density of from about 0.9 to about 1.4 g/mL, or can have a density of about 0.9, 1, 1.1, 1.2, 1.3, or about 1.4 g/mL, or a combination of any of the foregoing values, or a range encompassing any of the foregoing values. In one aspect, carbon foams prepared from high-volatile bituminous coals have a density of about 1.028 g/mL. In another aspect, carbon foams prepared from high-volatile bituminous coals have an electrical resistivity of from about 0.1 to about 0.5 $\Omega/ft^2$, or of about 0.1, 0.2, 0.3, 0.4, or about 0.5 $\Omega/ft^2$, or a combination of any of the foregoing values, or a range encompassing any of the foregoing values. In one aspect, carbon foams prepared from high volatile bituminous coals have an electrical resistivity of about 0.247 $\Omega/ft^2$.

Carbon foams as disclosed herein can be further characterized by additional methods. In one aspect, degree of anisotropy can be determined using polarized light microscopy. In another aspect, degree of anisotropy can be further characterized using a technique such as, for example, X-ray diffraction (XRD). In another aspect, XRD can be used to identify the properties of crystals formed in anisotropic regions of the carbon foams. In some aspects, crystal height can be from about 1.5 to about 2.1 nm, or can be about 1.5, 1.6, 1.7, 1.8, 1.9, 2.0, or about 2.1 nm. In one aspect, crystal height is about 1.8 nm. In other aspects, crystal lateral dimension can be from about 3 to about 3.8 nm, or can be about 3, 3.1, 3.2, 3.3, 3.4, 3.5, 3.6, 3.7, or about 3.8 nm. In one aspect, crystal lateral dimension is about 3.4 nm. In another aspect, spacing can be about 3.2 to about 4 Å, or can be about 3.2, 3.3, 3.4, 3.5, 3.6, 3.7, 3.8, 3.9, or about 4 Å. In one aspect, spacing is about 3.6 Å. In one aspect, when carbon foams have not yet been calcined, they display low anisotropy and low graphitization.

In one aspect, a technique such as SEM-EDS can be used to reveal structural details as well as some elemental analysis of carbon foams disclosed herein. In a further aspect, the carbon foams may sometimes retain some mineral content. In a further aspect, the mineral content includes aluminum and silicon. In one aspect, aluminum and silicon content is less than about 1% by weight, or is about 0, 0.1, 0.2, 0.3, 0.4, 0.5, 0.6, 0.7, 0.8, 0.9, or about 1% by weight. In a further aspect, the mineral content includes sulfur. In one aspect, sulfur content is less than about 1% by weight, or is about 0, 0.1, 0.2, 0.3, 0.4, 0.5, 0.6, 0.7, 0.8, 0.9, or about 1% by weight. In still another aspect, the carbon foams disclosed herein incorporate cagelike structures. In another aspect, the cagelike structures are relatively large. In still another aspect, the cagelike structures are from about 200 to about 400 μm, or are about 200, 225, 250, 275, 300, 325, 350, 375, or about 400 μm. In one aspect, the cages are about 300 μm.

In still another aspect, surface area and porosity can be determined using a technique such as, for example, nitrogen adsorption and desorption. In one aspect, nitrogen adsorption/desorption isotherms can be measured using an appropriate instrument. In a further aspect, using nitrogen adsorption and desorption data, surface area can be evaluated. In one aspect, nitrogen adsorption and desorption can be used to determine Brunauer-Emmett-Teller surface area. In a further aspect, surface area can be from about 2 to about 3 $m^2/g$, or can be about 2, 2.1, 2.2, 2.3, 2.4, 2.5, 2.6, 2.7, 2.8, 2.9, or about 3 $m^2/g$. In another aspect, surface area is about 2.65 $m^2/g$. In another aspect, bulk density determined by this method can be from about 0.5 to about 1 $g/cm^2$. In still another aspect, bulk density is about 0.5, 0.6, 0.7, 0.8, 0.9, or about 1 $g/cm^2$. In still another aspect, bulk density is about 0.78 $g/cm^2$.

In still another aspect, average grain size distribution can be determined using a technique such as, for example, SEM. In one aspect, different starting coal particle sizes result in different average grain sizes for the carbon foams produced. In one aspect, a carbon foam made from 20-35 mesh coal particles (starting particle size from about 500-841 μm) produces carbon foams with a grain size of from about 40 μm to about 390 μm, or from about 40 μm to about 75 μm, or about 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, or about 390 μm.

In yet another aspect, a carbon foam made from 60-100 mesh coal particles (starting particle size from about 149-250 μm) produces carbon foams with a grain size of from about 10 to about 110 µm, or from about 10 to about 50 µm, or about 10, 20, 30, 40, 50, 60, 70, 80, 90, 100, or about 110 µm.

In still another aspect, a carbon foam made from >100 mesh coal particles (starting particle size <149 µm) produces carbon foams with a grain size of from about 30 to about 175 µm, or about 75 to about 125 µm, or about 30, 40, 50, 60, 70, 80, 90, 100, 110, 120, 130, 140, 150, 160, 170, or about 175 µm.

In yet another aspect, a carbon foam made from 40-60 mesh coal particles (starting particle size 250-400 µm) produces carbon foams with a grain size of from about 25 to about 240 µm, or from about 40 to about 150 µm, or about 25, 30, 40, 50, 60, 70, 80, 90, 100, 110, 120, 130, 140, 150, 160, 170, 180, 190, 200, 210, 220, 230, or about 240 µm.

Compositions

In one aspect, disclosed herein are compositions including a conductive carbon material and a coal material.

In another aspect, disclosed herein are compositions including a conductive carbon material, a coal material, and a carbohydrate-rich syrup.

In still another aspect, disclosed herein are compositions including a conductive carbon material, a coal material, and a lignocellulosic waste material.

In still another aspect, disclosed herein are compositions including a conductive carbon material, a coal material, and a coal tar distillate.

In yet another aspect, disclosed herein are compositions including a conductive carbon material, a coal material, a coal tar distillate, and a solvent. In one aspect, the solvent is kerosene.

In a further aspect, disclosed herein are compositions including a conductive carbon material, a coal material, and a solvent. In one aspect, the solvent is NMP.

Carbon Foam Materials and Methods of Use

In one aspect, disclosed herein are carbon foam materials prepared by the disclosed processes. In another aspect, disclosed herein are carbon foam composite materials prepared by the disclosed processes. In still another aspect, disclosed herein are methods of use of the carbon foam materials and carbon foam composite materials disclosed herein.

In one aspect, the carbon foams produced by the processes disclosed herein are useful for various industrial uses. In a further aspect, the carbon foams can be mass produced to form sheets of insulation. In a further aspect, carbon foam insulation has the properties of a thermal insulator but does not burn and is thus useful as a building material. In some aspects, carbon foam insulation can be incorporated into firewalls on ships and in buildings.

In another aspect, the carbon foams can be formed into bricks useful for lining high-temperature furnaces. In one aspect, carbon foam bricks are less expensive to produce than the refractory bricks currently used in high-temperature furnaces.

In still another aspect, carbon foams as disclosed herein can absorb large amounts of energy during impact or crushing. In one aspect, carbon foams as disclosed herein may be useful in automotive applications to absorb energy from crashes, thereby reducing damage to automobiles and trucks while simultaneously lowering the likelihood of automobile occupant injury or death. In another aspect, the carbon foams disclosed herein can be used in military vehicle armor to prevent damage from improvised explosive devices.

In another aspect, the foams disclosed herein are able to absorb energy from projectiles such as, for example, bullets. In a further aspect, the carbon foams can be wrapped with Kevlar® in order to reduce projectile penetration while simultaneously resisting impact. In some aspects, the wrapped carbon foams can be provided with a thin aluminum face plate and be incorporated into body armor. In one aspect, body armor prepared in this manner is lightweight and also resistant to being damaged by bullets. In another aspect, this arrangement of materials can be used to line baggage containers on commercial aircraft to prevent damage to the aircraft structure from explosives contained within luggage or fires starting in luggage items (e.g., from lithium ion batteries). In a similar aspect, cladding or armor for buildings in areas with high risk of terrorism can be constructed from these materials.

In any of the above aspects, after calcination, the foams are open cell foams. In a further aspect, like other open cell foams, some cell boundaries have been broken, which allows air to occupy the cell interiors. In still another aspect, the foams are lightweight and have relatively low densities.

Aspects

The following listing of exemplary aspects supports and is supported by the disclosure provided herein.

Aspect 1. A process for producing a carbon foam material, the process comprising: a heating step comprising heating a homogeneous mixture of a coal material and at least one additional agent in a microwave heating apparatus; wherein the homogeneous mixture of a coal material and at least one additional agent comprises: (a) a coal material present in an amount of from about 20 wt % to about 75 wt % based on the total weight of the mixture; and (b) at least one additional agent present in an amount of from about 25 wt % to about 80 wt % based on the total weight of the mixture; and wherein the additional agent is capable of absorbing microwave radiation.

Aspect 2. The process of Aspect 1, wherein the heating step comprises heating the mixture to a temperature of from about 250° C. to about 700° C. for from about 1 minute to about 60 minutes.

Aspect 3. The process of Aspect 1 or 2, wherein the coal material has a particle size of between about 10 mesh and about 400 mesh.

Aspect 4. The process of Aspect 3, wherein the coal material has a particle size of between about 20 mesh and about 150 mesh.

Aspect 5. The process of any of Aspects 1-4, wherein the coal material comprises a high-volatile or low-volatile sub-bituminous coal material.

Aspect 6. The process of any of Aspects 1-5, wherein the coal material comprises pitch.

Aspect 7. The process of any of Aspects 1-6, wherein the additional agent comprises a flux agent.

Aspect 8. The process of Aspect 7, wherein the flux agent comprises a carbohydrate syrup.

Aspect 9. The process of Aspect 8, wherein the carbohydrate syrup is high fructose corn syrup.

Aspect 10. The process of Aspect 8, wherein the flux agent further comprises a secondary flux agent.

Aspect 11. The process of Aspect 10, wherein the secondary flux agent comprises a volatile compound produced in a coal conversion process, a coal tar, a product of petroleum distillation, or a combination thereof.

Aspect 12. The process of any of Aspects 1-11, wherein the additional agent comprises a lignocellulosic waste material.

Aspect 13. The process of Aspect 12, wherein the lignocellulosic waste material comprises sodium lignosulfonate.

Aspect 14. The process of any of Aspects 1-13, wherein the additional agent comprises a conductive carbon compound.

Aspect 15 The process of Aspect 14, wherein the conductive carbon compound comprises a carbon fiber, a carbon nanofiber, a carbon nanotube, a carbon flake, carbon black, a needle coke, graphene, graphene oxide, graphite, or a combination thereof.

Aspect 16. The process of Aspect 15, wherein the conductive carbon compound comprises graphite.

Aspect 17. The process of any of Aspects 1-16, wherein the additional agent comprises a solvent.

Aspect 18. The process of Aspect 17, wherein the solvent comprises N-methyl-2-pyrrolidone, kerosene, or a combination thereof.

Aspect 19. The process of Aspect 18, wherein the solvent comprises N-methyl-2-pyrrolidone.

Aspect 20. A process for calcining a carbon foam material, the process comprising:
 a. heating the carbon foam material to a temperature of from about 900° C. to about 1350° C. for a period of from about 10 seconds to about 3 hours;
 b. wherein calcining imparts electrical conductivity and mechanical stability to the carbon foam material.

Aspect 21. The process of Aspect 20, wherein the carbon foam material is calcined in a furnace.

Aspect 22. The process of Aspect 20 or 21, wherein heating is carried out for from about 1 hour to about 3 hours.

Aspect 23. The process of Aspect 20, wherein the carbon foam material is calcined in a microwave heating apparatus.

Aspect 24. The process of Aspect 23, wherein heating is carried out from about 1 minute to about 10 minutes.

Aspect 25. The process of Aspect 20, wherein the carbon foam material is calcined in an inductive field heater.

Aspect 26. The process of Aspect 25, wherein heating is carried out for from about 10 seconds to about 1 minute.

Aspect 27. The process of any of Aspects 20-26, wherein the process further produces an $sp^2$-hybridized carbon material.

Aspect 28. The process of Aspect 27, wherein the $sp^2$-hybridized carbon material comprises graphene, graphene oxide, graphite, or a combination thereof.

Aspect 29. A carbon foam material produced by the process of Aspect 1.

Aspect 30. A calcined carbon foam material produced by the process of Aspect 20.

Aspect 31. A composite material comprising the calcined carbon foam of Aspect 30.

Aspect 32. The carbon foam material of Aspect 29, wherein the carbon foam material has a resistivity of from about 0.1 to about 0.5 $\Omega/ft^2$.

Aspect 33. The carbon foam material of Aspect 29 or 32, wherein the carbon foam material has a density of from about 0.5 to about 1.5 g/cc.

Aspect 34. The carbon foam material of any of Aspects 29, 32, or 33 wherein the carbon foam material has a surface area of from about 2 to about 3 $m^2/g$.

Aspect 35. The carbon foam material of any of Aspects 29 or 32-34, wherein the carbon foam material has an average grain size of from about 10 to about 390 µm.

Aspect 36. The carbon foam material of Aspect 35, wherein the carbon foam material has an average grain size of from about 25 to about 240 µm.

Aspect 37. The calcined carbon foam material of Aspect 30, wherein the carbon foam material has a resistivity of from about 0.1 to about 0.5 $\Omega/ft^2$.

Aspect 38. The calcined carbon foam material of Aspect 30 or 37, wherein the carbon foam material has a density of from about 0.5 to about 1.5 g/cc.

Aspect 39. The calcined carbon foam material of any of Aspects 30, 37, or 38, wherein the carbon foam material has a surface area of from about 2 to about 3 $m^2/g$.

Aspect 40. The calcined carbon foam material of any of Aspects 30 or 37-39, wherein the carbon foam material has an average grain size of from about 10 to about 390 µm.

Aspect 41. The calcined carbon foam material of Aspect 40, wherein the carbon foam material has an average grain size of from about 25 to about 240 µm.

Aspect 42. An article comprising the carbon foam material of Aspect 29 or the calcined carbon foam material of Aspect 30.

Aspect 43. An article comprising a carbon foam material, wherein the carbon foam material has a resistivity of from about 0.1 to about 0.5 $\Omega/ft^2$.

Aspect 44. The article of Aspect 42 or 43, wherein the carbon foam material has a density of from about 0.5 to about 1.5 g/cc.

Aspect 45. The article of any of Aspects 42-44, wherein the carbon foam material has a surface area of from about 2 to about 3 $m^2/g$.

Aspect 46. The article of any of Aspects 42-45, wherein the carbon foam material has an average grain size of from about 10 to about 390 µm.

Aspect 47. The article of Aspect 46, wherein the carbon foam material has an average grain size of from about 25 to about 240 µm.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Materials

Low volatile bituminous coal samples were obtained from Rosebud Mining Corporation (Pennsylvania, USA). High volatile bituminous coal samples were obtained from Anker Energy (West Virginia, USA). Samples were ground and separated into size fractions using a RO-TAP® sieve shaker (W.S. Tyler, Ohio, USA) and stored in sealed containers until use.

High fructose corn syrup was purchased from Mann Lake, Ltd. (Minnesota, USA). Water content was determined to be 21% by placing a measured sample in a drying oven at 110° C. For some experiments, Karo syrup (a corn syrup that is not considered "high fructose" was used).

Analytical grade graphite powder was purchased from Alfa Aesar (Massachusetts, USA) and sized using a Coulter counter. Median size was 6 µm.

Pam® non-stick cooking spray (Conagra Brands, Ill., USA) was used as a release agent for ceramic containers.

Example 2: Coal Preparation

Figure 11:
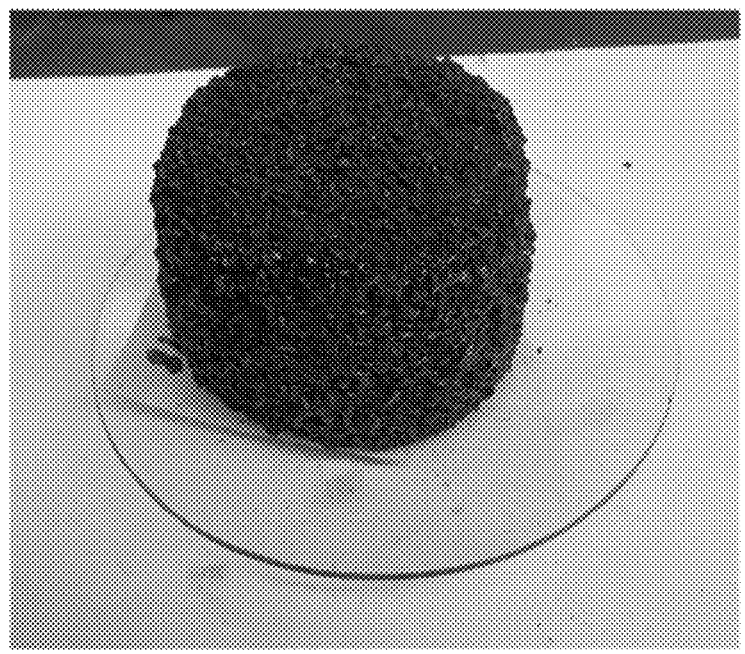
FIG. 11 shows a sample carbon foam sample prepared as disclosed herein having a larger starting particle size (i.e., smaller mesh number).
Figure 12:
FIG. 12 shows a sample carbon foam sample prepared as disclosed herein having a small-to-medium starting particle size (i.e., larger mesh number than in FIG. 11).

Coal was provided in approximately 60 lb batches after having been processed at a standard coal cleaning plant. The coal was fed three times through a hammer mill to reduce the particle size to about 2 mm. The coal was then fed into a coal pulverizer, which reduced the particle size to about 60 mesh. The pulverized coal was then sifted through a 60 mesh sieve to remove larger particles that had not been sufficiently pulverized. In some experiments, coal particles of other sizes and size ranges (e.g., 20-35 mesh, 35-60 mesh, 60-100 mesh, and >100 mesh) was used. In these experiments, coal was prepared by the same method but used an appropriately sized sieve to retrieve coal particles of the desired size. Carbon foams produced with large and smaller mesh sized coal particles can be seen in FIG. 11 and FIG. 12, respectively.

In some experiments, a stack of sieve trays was assembled to separate the particles into desired ranges. A series of sieves was placed above a collection pan. Pulverized coal was poured on top of the top sieve and covered with a lid. The sieves were placed in a sieve shaker and shaken using orbital motion for 10 minutes. The sieves were then disassembled one at a time and the surfaces of the sieves were scraped with a rubber spatula to eliminate any blinding effects. The sieves were then re-stacked and placed back into the sieve shaker for an additional 10 minutes. Following this step, the different mesh sizes of coal particles were collected, weighed, and stored for further experiments.

Example 3: Flux Agent Preparation

In some experiments, high fructose corn syrup or another carbohydrate syrup was used without further processing as flux agent. In other experiments, a portion of the flux agent was prepared as follows:

A 200 mL plastic container was weighed and labeled. Approximately 150 g of fructose or a carbohydrate syrup was added to the container. Recovered volatiles from a coal conversion process described in U.S. Pat. No. 8,226,816 and US Published Patent Application 2015/0083570 were obtained by collection from vacuum distillation step. These recovered volatiles included a mixture of hydrocarbons with boiling points ranging from about 80° C. to about 300° C. About 7.5 g of recovered volatiles were added to the fructose or carbohydrate syrup in the plastic container.

The plastic container was then sealed and shaken vigorously by hand for 60 seconds to mix the components of the flux agent. No change was observed after an additional 60 seconds of shaking and the mixture was then considered homogeneous.

Example 4: Foaming Mixture Preparation

For experiments in which a flux agent was used, the following procedure was employed to prepare the foaming composition:

A 250 mL glass beaker was labeled and weighed and 100 g of coal, prepared as described above, was added to the beaker. The flux agent container was shaken to ensure homogeneity and 30 g of flux agent mixture was added to the beaker with the coal. The contents of the beaker were stirred for stirred for several minutes, with additional flux material added as needed (in some experiments, an additional 20 g were added) to achieve an appropriate wetting level for the coal. The mixture was again stirred to ensure a homogeneous coal/flux mixture. In some experiments, the mixture was viscous enough that it could be kneaded by hand, using rubber gloves. When kneading was performed, the kneaded portion was added back to the remainder of the sample and stirring continued. A cycle of kneading and stirring was repeated several additional times.

Process Scale-Up

Foaming pitch can be prepared on a larger scale for industrial purposes or to enable numerous experiments to be conducted in parallel, according to the following steps.

Lignite coal was ground and passed through a 60 mesh sieve. Although a 60 mesh sieve was used for testing, the particle size can be varied without departing from the processes disclosed herein. In particular, the particle size can be further optimized during scaling for commercial operations. Following grinding and sieving, a slurry was prepared by dispersing 15 pounds of ground coal in 42 pounds of condensed and recycled volatiles from previous experiments scaled up but otherwise described above. These recycled volatiles are referred to in the following process as a solvent. Three pounds of hydrogenated vegetable oil was added to the slurry to act as a hydrogen donor during the coal conversion reaction.

The slurry was mixed via agitation and transferred into a stirred 10 gallon reaction vessel for coal digestion. Mixture homogeneity was maintained in the reactor vessel. Inside the vessel, the slurry was heated to about 120° C. and held there to allow vaporization of water and low boiling point volatiles present in the coal or solvent. These vapors were vented to a moisture collection vessel and removed from the reaction mixture. The contents of the moisture collection vessel were separately collected, weighed, and analyzed.

The reactor was then isolated and temperature increased to 550° C. and held for 1 h. Pressure inside the reactor was maintained between 500-600 psig with venting to allow excess volatiles from the reactor to escape into an expansion tank. The vapors produced at 550° C. were passed through a water-cooled heat exchanger en route to the expansion tank, condensing the vapors to a volatile liquid mixture. Liquid volatiles recovered from this step were weighed, samples were removed for analysis, and the bulk components were added to the recycled solvent mixture for use in future experiments. Non-condensable gases produced by the reaction were further vented from the expansion tank to a scrubber. These primarily contained hydrogen sulfide. Without wishing to be bound by theory, it was believed that the hydrogen sulfide was produced by the removal of sulfur from coal during the conversion process.

Once the reaction was complete, remaining pressure in the reactor was vented to the expansion tank and the remaining contents of the reactor, at this point a low-softening point mixture, were transferred into a larger volume holding tank (i.e., a flash vessel) to cool. The low-softening point mixture, containing reacted coal and mineral matter, remained in the flash vessel until the temperature reached 150° C. The mixture was then transferred into a centrifuge processing tank equipped with a gear pump to recycle the extract through a flow-driven centrifuge where ash is concentrated and collected within a rotating spindle. When ash removal was complete, the centrifuge spindle was removed and weighed for mass balance data. Enriched ash centrifuge tails, which form a cake-like residue of mineral matter and volatiles on the inside surface of the centrifuge spindle, were removed from the spindle and maintained for analysis and the spindle was cleaned. Depending on the specific characteristics of the coal used as a source material, the collected mineral matter can contain appreciable levels of rare earth elements (REEs) and, accordingly, can be considered an enriched rare earth elemental feedstock for further refining. It is to be understood that the disclosed procedure can be scaled to use a motor-driven scroll-type centrifuge for improved efficiency.

Following centrifugation, de-ashed pitch was pumped into a vacuum distillation apparatus and distillation was carried out by increasing the temperature to 280° C. while maintaining a vacuum of approximately 50 torr. The vacuum distillation column was equipped with a low flow rate nitrogen sparge to facilitate the flow of volatiles from the pitch. Without wishing to be bound by theory, the nitrogen sparge is believed to additionally facilitate orientation of the various moieties in the carbon pitch as it forms. The distillation system was equipped with a set of distillate collection vessels and condensers in parallel to collect different fractions of potentially valuable distillation volatiles, which were weighed and analyzed. The pitch was drained from the distillation column as a liquid at elevated temperature and allowed to cool to room temperature, at which point it solidified.

Foaming Pitch Preparation

Foaming pitch was then prepared using a process similar to the process used to prepare green foam, with the chief difference being heating to a lower temperature. In this process, the pitch partially devolatilizes but retains a high enough volatile content to be fluid at elevated temperatures, enabling carbon particles to fuse into carbon foam.

Furthermore, the system is operated at a pressure of about 700 torr. This slight vacuum increases the efficiency of volatile removal at the lower temperatures used, and provides for capture of the volatiles escaping the pitch to a vapor collection system. This prevents volatiles from condensing and refluxing when contacting the unheated surface of the vessel lid.

Once pitch was produced, it was placed in a storage container and held at −5° C. for 12 h. This causes the pitch to become brittle and easily removable from the storage container, weighed, and transferred into a customized coking vessel. The lid for the coking vessel was bolted into place after checking the lid gasket and the vessel was insulated using high temperature insulation and connected to a volatile recovery system, a nitrogen feed, and a power source.

A nitrogen purge was turned on at a flow rate of 20 psi in order to create an inert environment within the coking vessel as well as to facilitate the escape of volatiles to the condensation and recovery portion of the coking system. The vessel was heated from room temperature to 500° C. rapidly (i.e., over a period of about 3 h). The temperature was then maintained at 500° C. as the pitch continued to devolatilize. The coking vessel was allowed to cool for 12 h and disconnected from the power supply, nitrogen source, and volatile recovery system. Insulation was removed and top and bottom flanges were unbolted and removed. A chrome-plated steel plunger was used to push the foaming pitch out of the vessel and into a collection container, where it was inspected, weighed, and sampled for later analysis.

The foaming pitch was then subjected to a second devolatilization step in the coking vessel at 525° C. for 8 h.

Grinding and Sizing the Foaming Pitch

Pieces of pitch removed from the coking vessel ranged in size from 0.5 cm to about 8 cm. Larger pieces were crushed with a hand-operated rock crusher. Smaller pieces were ground to the desired particle size using a mortar and pestle.

Figure 5:
FIG. 5 shows a representative image of a disclosed carbon foam prepared low volatile bituminous coal feedstock and foaming pitch using a disclosed process. The foaming pitch was prepared using a disclosed method as described in Example 4.
Figure 6:
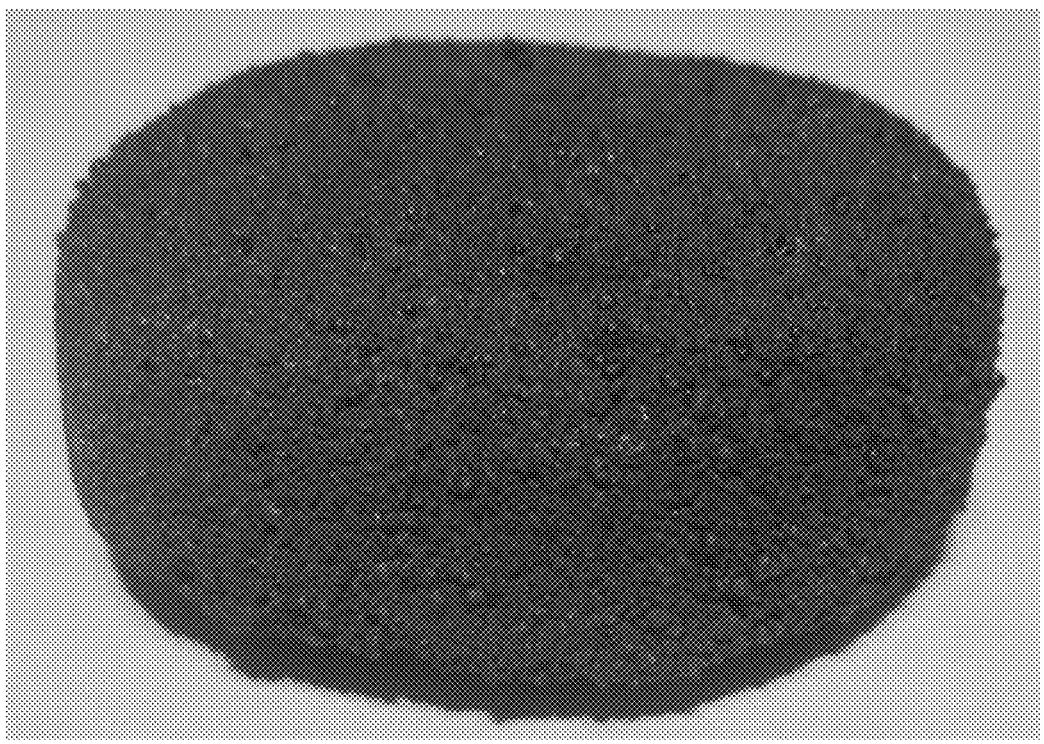
FIG. 6 shows a representative image of the underside of the carbon foam shown in FIG. 5. The image shows the underside of the carbon foam, i.e., the surface of the carbon foam in contact with the crucible.

A series of sieve trays was assembled to separate the pitch particles, with additional crushing as needed. The tray stack was shaken by hand to separate the material into the desired particle size ranges (e.g., 20-50 mesh, 50-100 mesh, and >100 mesh). Compacted particles were scraped off as needed and further crushing was carried out using either a rock crusher or mortar and pestle as described above. Example carbon foams produced using the foaming pitch as an additive are seen in FIGS. 5-6.

Example 5: General Procedure

Figure 18:
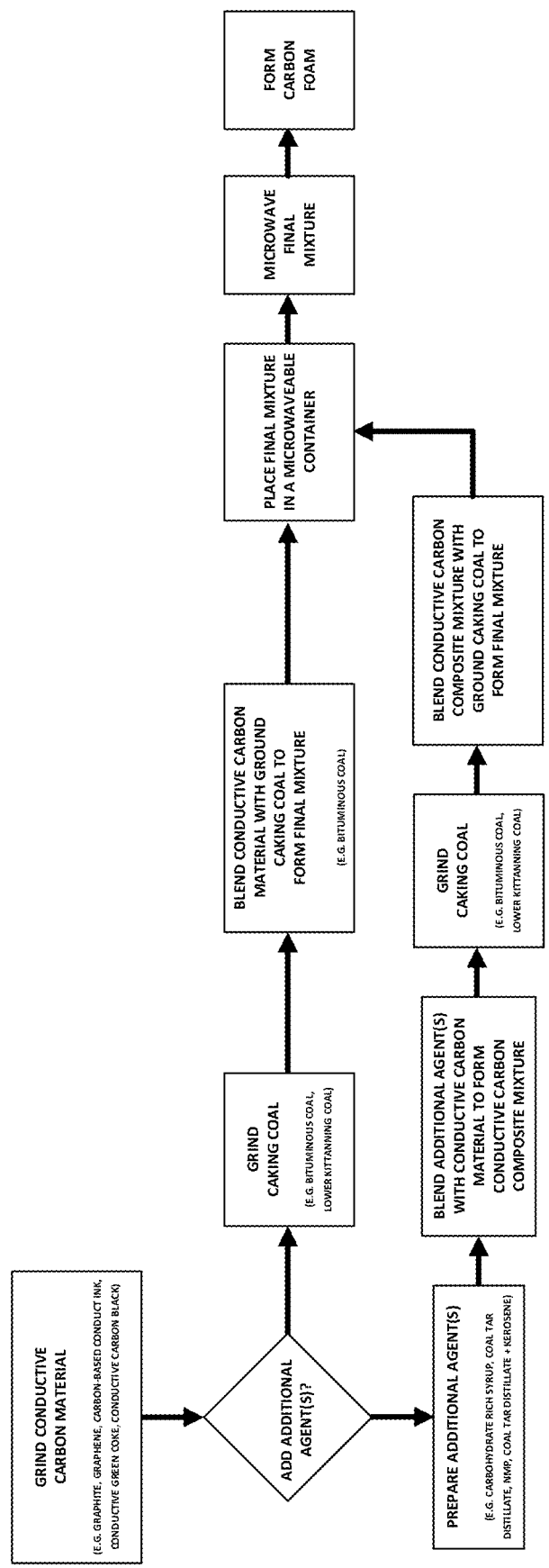
FIG. 18 shows a flow diagram for an exemplary process as disclosed herein.

Carbon foam samples were prepared according to the following general procedure (FIG. 18). Coal compositions as disclosed herein were placed into ceramic cups or other containers that had been previously coated with a release agent. Ceramic tiles were placed over the tops of the containers. Samples were placed in the microwave chamber and a power level and time increment were chosen. A typical time increment was from 1 to 5 minutes. After each heating cycle, the sample was removed from the microwave chamber and inspected. If the sample had risen during the heating cycle, it was compressed with a clean object having a flat surface (e.g., a beaker). Additional heating cycles were performed until the sample solidified and no more rising was observed. Some experiments were performed using high fructose corn syrup as a flux agent and some experiments used sodium lignosulfonate as a binding agent, with high fructose corn syrup flux samples being generally structurally stronger than sodium lignosulfonate flux samples.

In some experiments, coal and flux mixtures were microwaved in a crucible that was placed inside a 1 L glass beaker covered with a 6-inch diameter watch glass, a configuration that allowed released volatile compounds to escape the beaker and avoid any pressure build up. The beaker glass did not respond to microwave radiation in the same manner as the coal mixture and remained cooler; thus escaped volatiles from the crucible condensed on the interior surface of the beaker during microwaving.

Crucible loading was accomplished by placing a sufficient amount of material to cover the entire bottom of the crucible and roughly fill it without packing the mixture. The mixture was then compressed into the crucible with further kneading by hand. As needed, additional amounts of the mixture were added and kneaded into place, with addition and kneading repeated until the crucible was filled and the mixture was not further compressible. The flat edge of a paint scraper was used to press the mixture into the crucible with any excess material being scraped away across the surface. When the crucible was completely filled and compressed, it was weighed to determine the starting amount of material.

Microwaved foam samples were observed following microwaving to find outwardly bulging portions. Without wishing to be bound by theory, it was believed that the bulging portion was formed as volatile components escaped from the foam. Thus, the carbon foam and the bulging portion were malleable and could be molded or shaped. It was thus concluded, without wishing to be bound by theory, that the carbon material was in a pseudo-fluid state while at higher temperature and did not form a solid foam structure until it had sufficiently cooled. Accordingly, it should be possible to mold or extrude a partially formed carbon foam into specific sizes and shapes without the need for expensive processing to form specific shapes for an end product. Samples thus formed (referred to herein as foaming/flux pitches) were then placed into ceramic crucibles for calcination. Without wishing to be bound by theory, it is believed that swelling or bulging is principally caused by rapid vaporization of light volatiles and/or moisture in the flux agent and that this swelling or bulging can be reduced by heating the sample at a slower rate during the initial stages of heating. It is further believed that swelling or bulging can be reduced by heating the sample to about 105° C. to drive off moisture and some low boiling point volatiles prior to the first microwave heating step. Example foams produced by this process can be seen in FIGS. 1-4.

Carbon Foam Production at Atmospheric Pressure using Low Volatile Bituminous Coal The starting material for one set of experiments was low volatile bituminous coal ground to a particle size of 80-100 mesh. The coal was combined with a flux agent at a 2:1 ratio by weight, where the flux mixture consisted of 95% fructose and 5% recovered distillation volatiles as described elsewhere in the Examples. The coal and flux agent were combined to a homogeneous mixture and pressed into a crucible, which was in turn placed into a 1 L beaker covered by a watch glass. The beaker containing the crucible was placed into an 1100 W microwave, which was operated for 5 min at power level 3, equivalent to about 330 W. The carbon foam that was produced expanded slightly above the level of the crucible and was pushed back down using a larger crucible. The carbon foam and crucible were heated to 600° C. and calcined at 900° C. as described herein.

Example 6: Graphite-Assisted Foam Formation

Samples containing high fructose corn syrup as an additional agent but lacking a conductive carbon compound were prepared as described above. Samples containing high fructose corn syrup as well as 1% by weight or 5% by weight graphite were also prepared. Samples containing 1% by weight graphite reached the required temperatures more easily and thus formed green foam more quickly, and a similar increase was also seen for samples containing 5% by weight graphite, regardless of whether high volatile or low volatile bituminous coal was used. Results were similar for different coal particle sizes (20-35 mesh, 35-60 mesh, 60-100 mesh, and >100 mesh) as well as for different microwave power levels, with the largest impact of increasing graphite concentration on foam formation time at low power levels. A 1000 W microwave was used for most experiments.

Example 7: Foam Compositions

Variables including coal particle size (as mesh size); coal type; weight percent of optional components including high fructose corn syrup, graphite powder, sodium lignosulfonate; and microwave power were evaluated to assess their effects on carbon formation. Results are presented below in Table 1:

TABLE 1

Foaming Blend Compositions and Microwave Foaming Responses

| Mesh Size | Coal Type | Weight % Coal | Weight % High Fructose Corn Syrup | Weight % Flux Mixture | Weight % Graphite Powder | Weight % Sodium Lignosulfonate | Microwave Power (% of Total Power) | Time to Form Solid (min) | Time to Form Coal Tar (min) |
|---|---|---|---|---|---|---|---|---|---|
| 20-35 | 78 | 60 | 40 | 0 | 0 | 0 | 20 | 85 | |
| 20-35 | 78 | 59 | 40 | 0 | 1 | 0 | 20 | 65 | |
| 20-35 | 78 | 55 | 40 | 0 | 5 | 0 | 20 | 36 | 38 |
| 20-35 | 78 | 55 | 40 | 0 | 5 | 0 | 20 | 60 | |
| 20-35 | 78 | 55 | 43 | 0 | 2 | 0 | 20 | 105 | 100 |
| 20-35 | 78 | 55 | 44 | 0 | 1 | 0 | 20 | 105 | 100 |
| 20-35 | 78 | 60 | 40 | 0 | 0 | 0 | 50 | 26 | |
| 20-35 | 78 | 59 | 40 | 0 | 1 | 0 | 50 | 23 | |
| 20-35 | 78 | 55 | 40 | 0 | 5 | 0 | 50 | 22 | 25 |
| 20-35 | 78 | 55 | 40 | 0 | 5 | 0 | 50 | 17 | 7 |
| 20-35 | 78 | 55 | 40 | 0 | 5 | 0 | 50 | 18 | |
| 20-35 | 78 | 55 | 45 | 0 | 0 | 0 | 50 | 40 | 25 |
| 20-35 | 78 | 60 | 40 | 0 | 0 | 0 | 100 | 10 | |
| 20-35 | 78 | 59 | 40 | 0 | 1 | 0 | 100 | 8 | |
| 20-35 | 78 | 55 | 40 | 0 | 5 | 0 | 100 | 5 | 5 |
| 20-35 | 78 | 55 | 40 | 0 | 5 | 0 | 100 | 5 | 4 |
| 20-35 | 78 | 55 | 40 | 0 | 5 | 0 | 100 | 5 | |
| 35-60 | 78 | 60 | 40 | 0 | 0 | 0 | 20 | 79 | |

TABLE 1-continued

Foaming Blend Compositions and Microwave Foaming Responses

| Mesh Size | Coal Type | Weight % Coal | Weight % High Fructose Corn Syrup | Weight % Flux Mixture | Weight % Graphite Powder | Weight % Sodium Lignosulfonate | Microwave Power (% of Total Power) | Time to Form Solid (min) | Time to Form Coal Tar (min) |
|---|---|---|---|---|---|---|---|---|---|
| 35-60 | 78 | 59 | 40 | 0 | 1 | 0 | 20 | 62 | |
| 35-60 | 78 | 55 | 40 | 0 | 5 | 0 | 20 | 56 | |
| 35-60 | 78 | 60 | 40 | 0 | 0 | 0 | 50 | 34 | |
| 35-60 | 78 | 59 | 40 | 0 | 1 | 0 | 50 | 30 | |
| 35-60 | 78 | 55 | 40 | 0 | 5 | 0 | 50 | 22 | |
| 35-60 | 78 | 65 | 30 | 5 | 0 | 0 | 100 | 6 | NA |
| 35-60 | 78 | 65 | 30 | 5 | 0 | 0 | 100 | 10 | 13 |
| 35-60 | 78 | 65 | 30 | 5 | 0 | 0 | 100 | 10 | 13 |
| 35-60 | 78 | 65 | 30 | 5 | 0 | 0 | 100 | 10 | NA |
| 35-60 | 78 | 60 | 40 | 0 | 0 | 0 | 100 | 8 | |
| 35-60 | 78 | 59 | 40 | 0 | 1 | 0 | 100 | 7 | |
| 35-60 | 78 | 55 | 40 | 0 | 5 | 0 | 100 | 6 | |
| 60-100 | 78 | 60 | 40 | 0 | 0 | 0 | 20 | 74 | |
| 60-100 | 78 | 59 | 40 | 0 | 1 | 0 | 20 | 58 | |
| 60-100 | 78 | 66 | 40 | 0 | 5 | 0 | 20 | 50 | 60 |
| 60-100 | 78 | 55 | 40 | 0 | 5 | 0 | 20 | 50 | |
| 60-100 | 78 | 60 | 40 | 0 | 0 | 0 | 50 | 17 | |
| 60-100 | 78 | 59 | 40 | 0 | 1 | 0 | 50 | 16 | |
| 60-100 | 78 | 55 | 40 | 0 | 5 | 0 | 50 | 15 | |
| 60-100 | 78 | 60 | 0 | 0 | 2 | 38 | 100 | 3 | NA |
| 60-100 | 78 | 60 | 0 | 0 | 2 | 38 | 100 | 3 | NA |
| 60-100 | 78 | 50 | 0 | 0 | 45 | 5 | 100 | NA | NA |
| 60-100 | 78 | 60 | 35 | 0 | 5 | 0 | 100 | 3 | 15 |
| 60-100 | 78 | 60 | 40 | 0 | 0 | 0 | 100 | 7 | |
| 60-100 | 78 | 59 | 40 | 0 | 1 | 0 | 100 | 6 | |
| 60-100 | 78 | 55 | 40 | 0 | 5 | 0 | 100 | 6 | |
| 60-100 | 78 | 50 | 45 | 0 | 5 | 0 | 100 | 3 | 4 |
| >100 | 78 | 60 | 40 | 0 | 0 | 0 | 20 | 70 | |
| >100 | 78 | 59 | 40 | 0 | 1 | 0 | 20 | 55 | |
| >100 | 78 | 55 | 40 | 0 | 5 | 0 | 20 | 48 | |
| >100 | 78 | 60 | 40 | 0 | 0 | 0 | 50 | 12 | |
| >100 | 78 | 59 | 40 | 0 | 1 | 0 | 50 | 9 | |
| >100 | 78 | 55 | 40 | 0 | 5 | 0 | 50 | 8 | |
| >100 | 78 | 60 | 40 | 0 | 0 | 0 | 100 | 5 | NA |
| >100 | 78 | 60 | 40 | 0 | 0 | 0 | 100 | 6 | |
| >100 | 78 | 59 | 40 | 0 | 1 | 0 | 100 | 5 | NA |
| >100 | 78 | 59 | 40 | 0 | 1 | 0 | 100 | 5 | |
| >100 | 78 | 55 | 40 | 0 | 5 | 0 | 100 | 4 | |
| >100 | 78 | 55 | 40 | 0 | 5 | 0 | 100 | 4 | NA |
| 20-35 | Kittanning | 60 | 40 | 0 | 0 | 0 | 20 | 220 | |
| 20-35 | Kittanning | 59 | 40 | 0 | 1 | 0 | 20 | 200 | |
| 20-35 | Kittanning | 55 | 40 | 0 | 5 | 0 | 20 | 140 | |
| 20-35 | Kittanning | 60 | 40 | 0 | 0 | 0 | 50 | 55 | |
| 20-35 | Kittanning | 59 | 40 | 0 | 1 | 0 | 50 | 48 | |
| 20-35 | Kittanning | 55 | 40 | 0 | 5 | 0 | 50 | 34 | |
| 20-35 | Kittanning | 65 | 30 | 5 | 0 | 0 | 100 | 8 | NA |
| 20-35 | Kittanning | 65 | 30 | 5 | 0 | 0 | 100 | 6 | NA |
| 20-35 | Kittanning | 65 | 30 | 5 | 0 | 0 | 100 | 8 | NA |
| 20-35 | Kittanning | 65 | 30 | 5 | 0 | 0 | 100 | 8 | NA |
| 20-35 | Kittanning | 65 | 30 | 5 | 0 | 0 | 100 | 6 | 8 |
| 20-35 | Kittanning | 60 | 40 | 0 | 0 | 0 | 100 | 18 | |
| 20-35 | Kittanning | 59 | 40 | 0 | 1 | 0 | 100 | 16 | |
| 20-35 | Kittanning | 55 | 40 | 0 | 5 | 0 | 100 | 12 | |
| 35-60 | Kittanning | 60 | 40 | 0 | 0 | 0 | 20 | 216 | |
| 35-60 | Kittanning | 59 | 40 | 0 | 1 | 0 | 20 | 192 | |
| 35-60 | Kittanning | 55 | 40 | 0 | 5 | 0 | 20 | 118 | |
| 35-60 | Kittanning | 60 | 40 | 0 | 0 | 0 | 50 | 49 | |
| 35-60 | Kittanning | 59 | 40 | 0 | 1 | 0 | 50 | 41 | |
| 35-60 | Kittanning | 55 | 40 | 0 | 5 | 0 | 50 | 30 | |
| 35-60 | Kittanning | 65 | 30 | 5 | 0 | 0 | 100 | 8 | 8 |
| 35-60 | Kittanning | 65 | 30 | 5 | 0 | 0 | 100 | 8 | 8 |
| 35-60 | Kittanning | 65 | 30 | 5 | 0 | 0 | 100 | 12 | NA |
| 35-60 | Kittanning | 65 | 30 | 5 | 0 | 0 | 100 | 6 | NA |
| 35-60 | Kittanning | 65 | 30 | 5 | 0 | 0 | 100 | 14 | NA |
| 35-60 | Kittanning | 60 | 40 | 0 | 0 | 0 | 100 | 17 | |
| 35-60 | Kittanning | 59 | 40 | 0 | 1 | 0 | 100 | 15 | |
| 35-60 | Kittanning | 55 | 40 | 0 | 5 | 0 | 100 | 10 | |
| 60-100 | Kittanning | 60 | 40 | 0 | 0 | 0 | 20 | 212 | |
| 60-100 | Kittanning | 59 | 40 | 0 | 1 | 0 | 20 | 180 | |
| 60-100 | Kittanning | 55 | 40 | 0 | 5 | 0 | 20 | 104 | |
| 60-100 | Kittanning | 60 | 40 | 0 | 0 | 0 | 50 | 40 | |

TABLE 1-continued

Foaming Blend Compositions and Microwave Foaming Responses

| Mesh Size | Coal Type | Weight % Coal | Weight % High Fructose Corn Syrup | Weight % Flux Mixture | Weight % Graphite Powder | Weight % Sodium Ligno-sulfonate | Microwave Power (% of Total Power) | Time to Form Solid (min) | Time to Form Coal Tar (min) |
|---|---|---|---|---|---|---|---|---|---|
| 60-100 | Kittanning | 59 | 40 | 0 | 1 | 0 | 50 | 34 | |
| 60-100 | Kittanning | 55 | 40 | 0 | 5 | 0 | 50 | 26 | |
| 60-100 | Kittanning | 65 | 30 | 5 | 0 | 0 | 100 | 8 | NA |
| 60-100 | Kittanning | 65 | 30 | 5 | 0 | 0 | 100 | 8 | NA |
| 60-100 | Kittanning | 65 | 30 | 5 | 0 | 0 | 100 | 10 | NA |
| 60-100 | Kittanning | 65 | 30 | 5 | 0 | 0 | 100 | 8 | NA |
| 60-100 | Kittanning | 65 | 30 | 5 | 0 | 0 | 100 | 14 | NA |
| 60-100 | Kittanning | 65 | 30 | 5 | 0 | 0 | 100 | 12 | NA |
| 60-100 | Kittanning | 60 | 40 | 0 | 0 | 0 | 100 | 17 | |
| 60-100 | Kittanning | 59 | 40 | 0 | 1 | 0 | 100 | 15 | |
| 60-100 | Kittanning | 55 | 40 | 0 | 5 | 0 | 100 | 10 | |
| >100 | Kittanning | 60 | 40 | 0 | 0 | 0 | 20 | 202 | |
| >100 | Kittanning | 59 | 40 | 0 | 1 | 0 | 20 | 168 | |
| >100 | Kittanning | 55 | 40 | 0 | 5 | 0 | 20 | 98 | |
| >100 | Kittanning | 60 | 40 | 0 | 0 | 0 | 50 | 26 | |
| >100 | Kittanning | 59 | 40 | 0 | 1 | 0 | 50 | 24 | |
| >100 | Kittanning | 55 | 40 | 0 | 5 | 0 | 50 | 19 | |
| >100 | Kittanning | 65 | 30 | 5 | 0 | 0 | 100 | 6 | NA |
| >100 | Kittanning | 65 | 30 | 5 | 0 | 0 | 100 | 6 | NA |
| >100 | Kittanning | 65 | 30 | 5 | 0 | 0 | 100 | 6 | NA |
| >100 | Kittanning | 65 | 30 | 5 | 0 | 0 | 100 | 4 | NA |
| >100 | Kittanning | 65 | 30 | 5 | 0 | 0 | 100 | 6 | NA |
| >100 | Kittanning | 60 | 40 | 0 | 0 | 0 | 100 | 11 | |
| >100 | Kittanning | 59 | 40 | 0 | 1 | 0 | 100 | 10 | |
| >100 | Kittanning | 55 | 40 | 0 | 5 | 0 | 100 | 8 | |

Figure 13:
FIG. 13 shows a sample carbon foam sample manufactured using a sodium lignosulfonate solution as binder.

Mesh size refers to particle size of the coal as described previously. Coal type refers either to a low volatile bituminous clay (e.g., "Kittanning" in the table) or a high volatile bituminous clay (e.g., "78" in the table). Time to form solid indicates microwave time at the given power for the sample to form a foam. Flux mixture as used herein refers to a 95% high fructose corn syrup, 5% recovered coal volatile solvent mix. Sodium lignosulfonate mixture as used herein refers to a black liquor as described above. In some instances, a time to form coal tar is also reported. This indicates, in most cases, that additional microwave heating was performed and the sample turned into a coal tar-like substance. In several cases, experiments were replicated several times; data for each replicate is presented in Table 1 on a separate line. An example foam prepared using a sodium lignosulfonate mixture as binder can be seen in FIG. 13.

Example 8: Carbon Foam Formation in a Furnace

Furnace Pyrolysis

Initial calcination experiments were carried out on green, coke-like foams as follows. A custom steel box was fabricated (Northco Manufacturing, West Virginia, USA) and partially filled with 1-2 mm graphitized carbon chips (GrafTech International, Ltd., West Virginia, USA) for some experiments. In other experiments, a ceramic bowl was used in place of the steel box. Green foam pieces were placed in crucibles with appropriately-sized lids and buried with additional graphitized carbon chips and steel wool was added to the top of the box or bowl to serve as oxygen scavenger and ensure the atmosphere remained inert or reducing. The steel box or ceramic bowl (covered with a ceramic tile) was placed in a large muffle furnace. Without wishing to be bound by theory, it was believed that heating foam samples at higher temperatures in an oxidizing environment would lead to combustion of the carbon foams, resulting in production of ash rather than of stable carbon foams. In order to maintain consistent heating rates, inert gas flow presented problems. It was further believed that the graphite chips oxidized to carbon dioxide prior to any oxygen reaching the crucibles (i.e., the graphite chips acted as a sink for oxygen entering the system). The graphite chips also allowed volatiles or other gases escaping from the crucibles to exit the sample box or bowl and, ultimately, to escape the furnace.

In initial experiments, two furnace heating steps were employed. The steel box or ceramic bowl was placed inside the furnace, which was programmed as follows:
 (a) the temperature was increased from room temperature at a rate of 200° C./hour to 400° C.;
 (b) the heating rate was decreased to 100° C./hour until the temperature reached 600° C.;
 (c) the furnace was held at 600° C. for 3 h;
 (d) the furnace was turned off and allowed to cool for 10 h.

Once the furnace had cooled, the steel box or ceramic bowl was removed. The steel wool typically showed significant oxidation and fusion into a single mass. It was removed and discarded. Graphite chips were removed and retained for reuse. The carbon foam sample was removed from the crucible, inspected, and weighed. A typical sample with a starting weight of 27.2 g had a final weight of 21.6 g. Carbon foam samples were also tested for electrical conductivity using a voltmeter and typically found to be conductive.

Furnace Calcination

Following this initial step, a second heat treatment was performed to drive off additional volatile components, increase the carbon content of the foam, and increase the strength and crush resistance of the foam. For this calcination step, foam samples formed as described previously were placed back in their original crucibles and covered with the original lids. The crucibles were then placed back into the ceramic bowl or steel box and covered with graphite chips and steel wool as described previously. The steel box was closed or the ceramic bowl was re-covered with a ceramic tile and the whole assembly was placed back inside the furnace. The furnace was programmed for calcination as follows:
 (a) The furnace was heated at a rate of 500° C./h to 400° C.;
 (b) the heating rate was reduced to 100° C./h until a temperature of 550° C. was reached;
 (c) the heating rate was again reduced to 50° C./h until a temperature of 700° C. was reached;
 (d) the heating rate was again reduced to 25° C.\h until a temperature of 900° C. was reached;
 (e) the temperature was held at 900° C. for 1 h;
 (f) the furnace was turned off and allowed to slowly cool over a period of 12 h.

After cooling, the container holding the samples was removed from the furnace and emptied as described above. Calcined carbon foam samples were removed from their crucibles and weighed and their electrical conductivity was determined.

In later experiments, heating was accomplished in a single step by an initial quick ramp to 550° C. and then slower heating to 900° C. at a rate of 75° C. per hour. The samples were held at 900° C. for three hours and then allowed to cool to room temperature. Samples were retrieved from the steel box and examined. A typical piece of carbon foam contracts by about 30 vol % during calcination while becoming harder, stronger, and more electrically conductive. When heating was not uniform, due to the insulating nature of the foam, contraction caused internal strains which occasionally resulted in the formation of cracks.

Microwave-Assisted Calcination

An alternative, microwave-assisted calcination procedure for samples containing a conductive carbon compound was designed to address the issue of internal strains and cracks resulting from the initial calcination procedure described above.

Non-calcined foam samples containing a conductive carbon compound were tested with a multimeter to determine conductivity. Samples were then heated in a microwave in 5 minute intervals until one hour of exposure time had been reached. After one hour, samples were re-evaluated for conductivity, with the presence of conductivity being an indicator that calcination had occurred. Microwave experiments were conducted in a microwave oven that had been purged with an inert gas to create a non-oxidizing atmosphere.

Inductive Field Calcination

Figure 14:
FIG. 14 shows a sample carbon foam sample prior to calcination via inductive heating as described herein.
Figure 15:
FIG. 15 shows a sample carbon foam sample following calcination via inductive heating as described herein. Also shown is an example inductive heating apparatus.

Since graphite absorbs radio wave energy produced by inductive fields, an inductive heating calcination procedure was designed to avoid any risk of sparking due to high conductive carbon compound content in carbon foam samples. In a typical experiment, a carbon foam sample tested for conductivity using a multimeter and then placed between the coils of an inductive heater. After a heating interval of 30 seconds, the sample was removed and again tested for conductivity; an increase in conductivity was detected, indicating the suitability of the inductive heating method for calcination of carbon foam. Sample foams prepared by inductive field heating, as well as an apparatus used for inductive field calcination, can be seen in FIGS. 14-15.

Example 9: Foam Properties

Density and electrical resistivity were assessed for selected foam samples. These values are presented in Table 2:

TABLE 2

Density and Electrical Resistivity of Carbon Foams

| Sample | Density | | | | Electrical Resistivity ($\Omega/ft^2$) | |
| --- | --- | --- | --- | --- | --- | --- |
| | Dry Weight (g) | Submerged Weight (g) | Wet Weight (g) | Density (g/mL) | Mean | Standard Deviation |
| Kittanning | 7.793 | 3.428 | 10.207 | 1.151 | 0.138 | 0.025 |
| 78 | 7.113 | 3.454 | 10.379 | 1.028 | 0.247 | 0.049 |

Each sample had a coal size of 35-60 mesh, with 65 weight % coal and 35 weight % high fructose corn syrup. Coal types are as described in Example 4.

Figure 19:
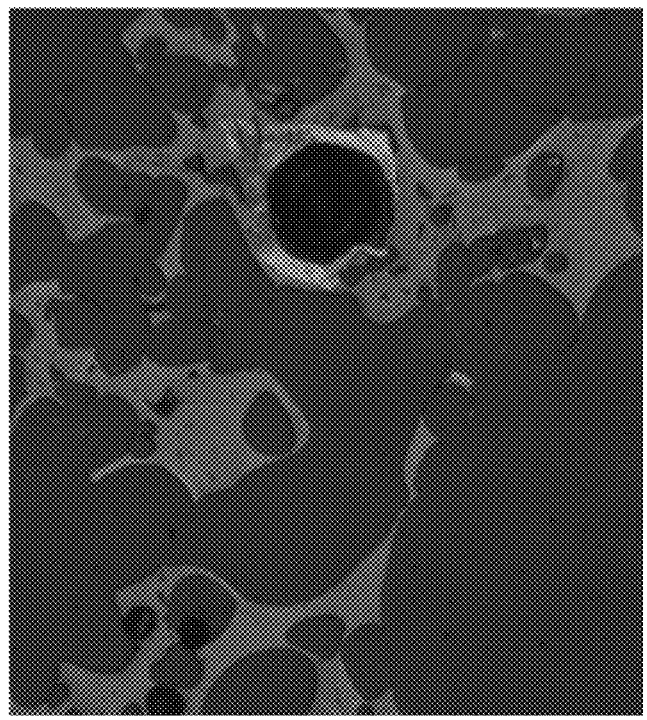
FIG. 19 shows a polarized light microscopy image of a carbon foam as disclosed herein, with added color tint.
Figure 20:
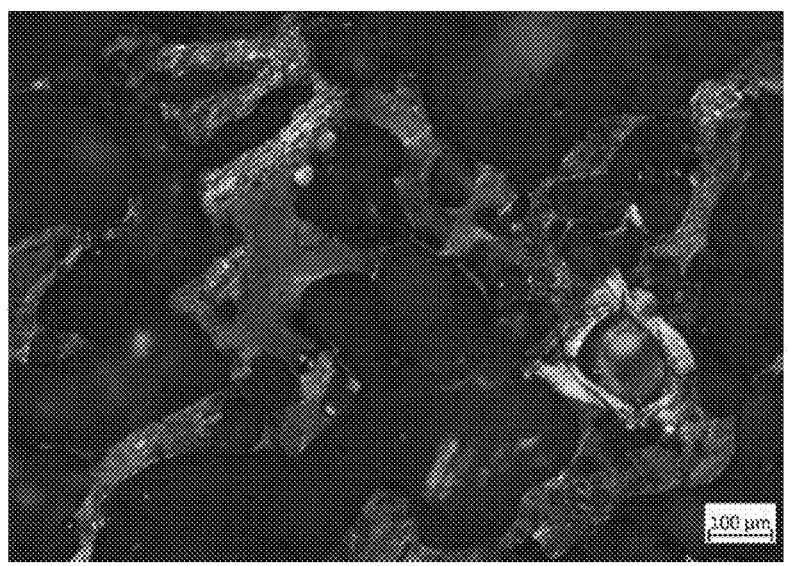
FIG. 20 shows a polarized light microscopy image of a carbon foam as disclosed herein, without added color tint.

The carbon foams disclosed herein were characterized by various methods. Polarized light microscopy images (see FIGS. 19-20, with and without a color tint) show that the foams are largely isotropic but are characterized by some pressure-induced anisotropy.

Figure 21:
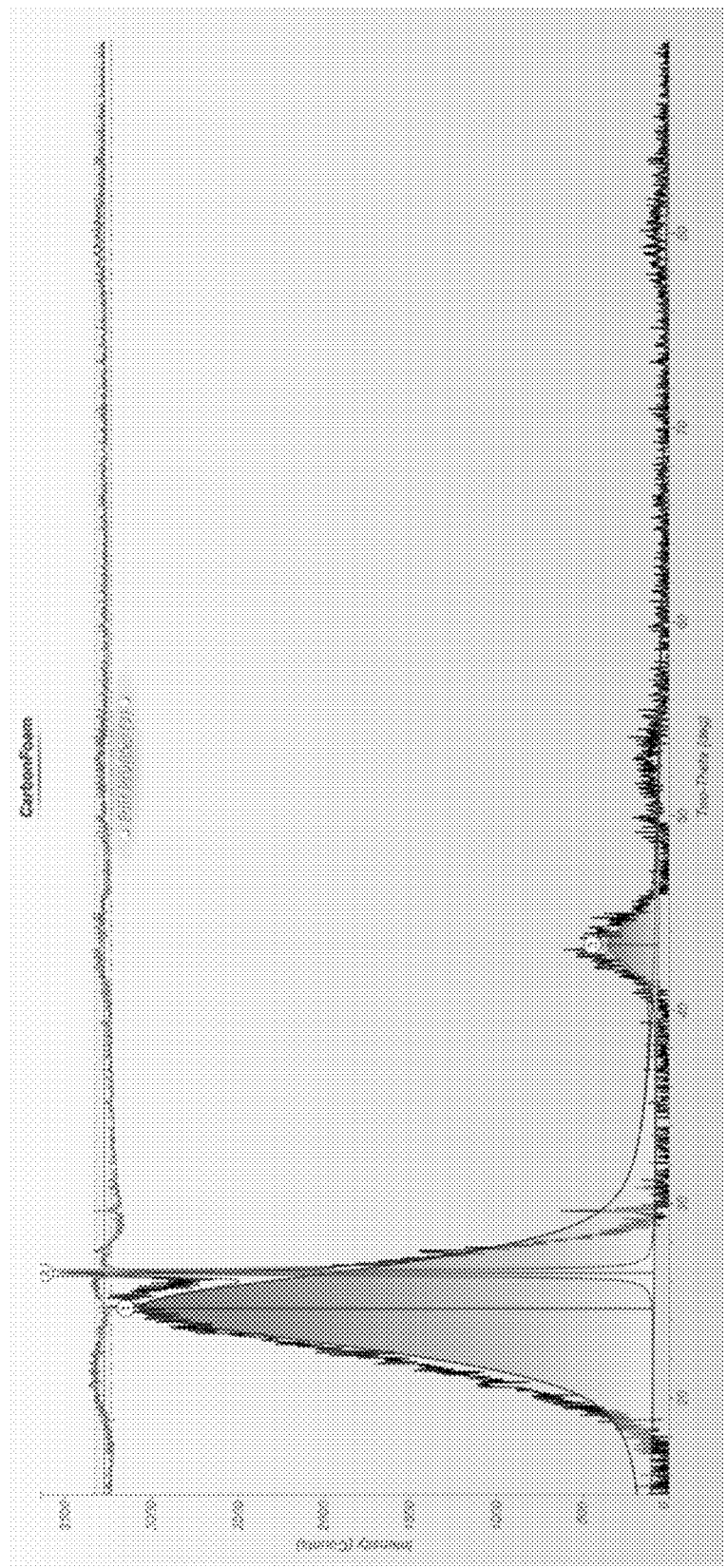
FIG. 21 shows X-ray diffraction results for a sample carbon foam as disclosed herein.

X-ray diffraction (XRD) analysis showed that the carbon foams were composed largely of disorganized material with a small region of crystalline order from the anisotropic regions (see FIG. 21). Crystal height for these regions was 1.8 nm and crystal lateral dimension was 3.4 nm. An approximately 3.6 Å spacing was observed with a degree of graphitization being 0.

Figure 22:
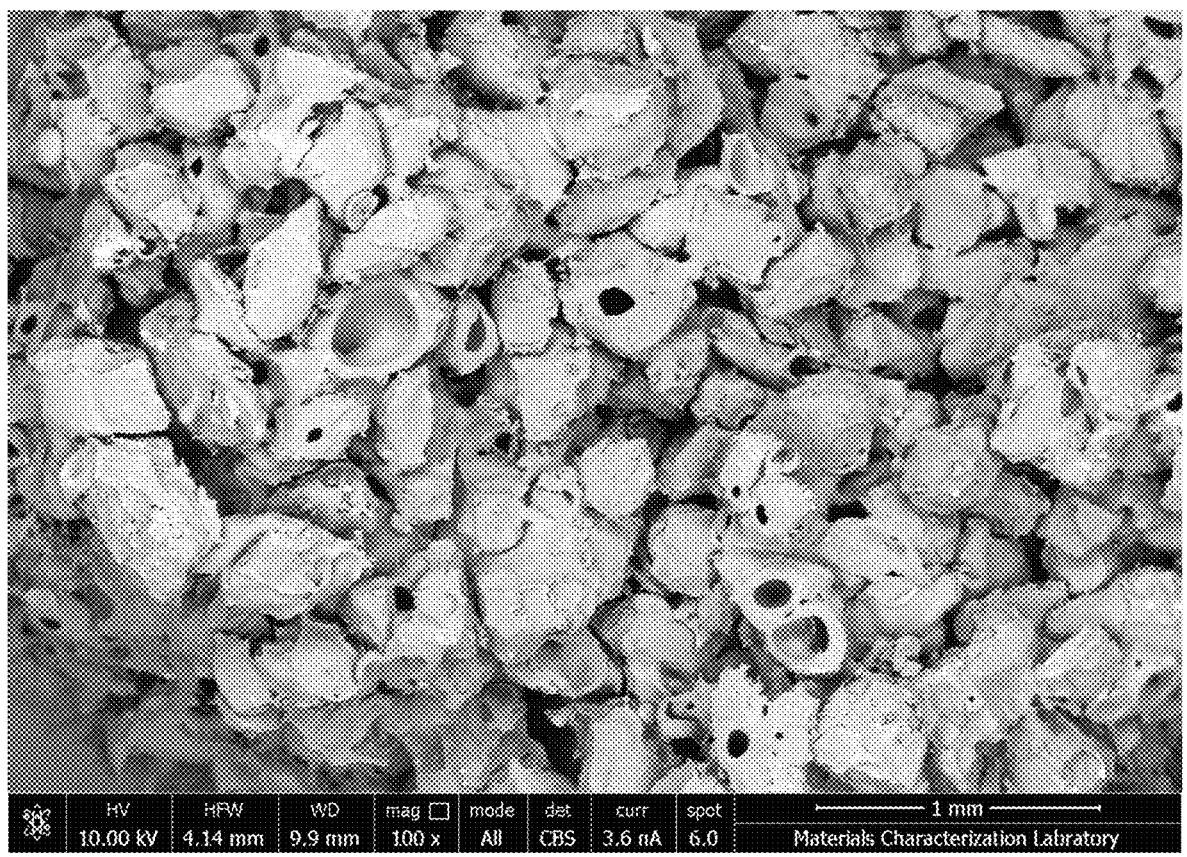
FIG. 22 shows a scanning electron microscope energy dispersive X-ray spectroscopy (SEM-EDS) image of an example carbon foam as disclosed herein.

SEM-EDS images reveal a cage-like structure; analysis showed some mineral matter detected, with aluminum and silicon content less than 1 wt % and sulfur content less than 1 wt % (FIG. 22).

Figure 23:
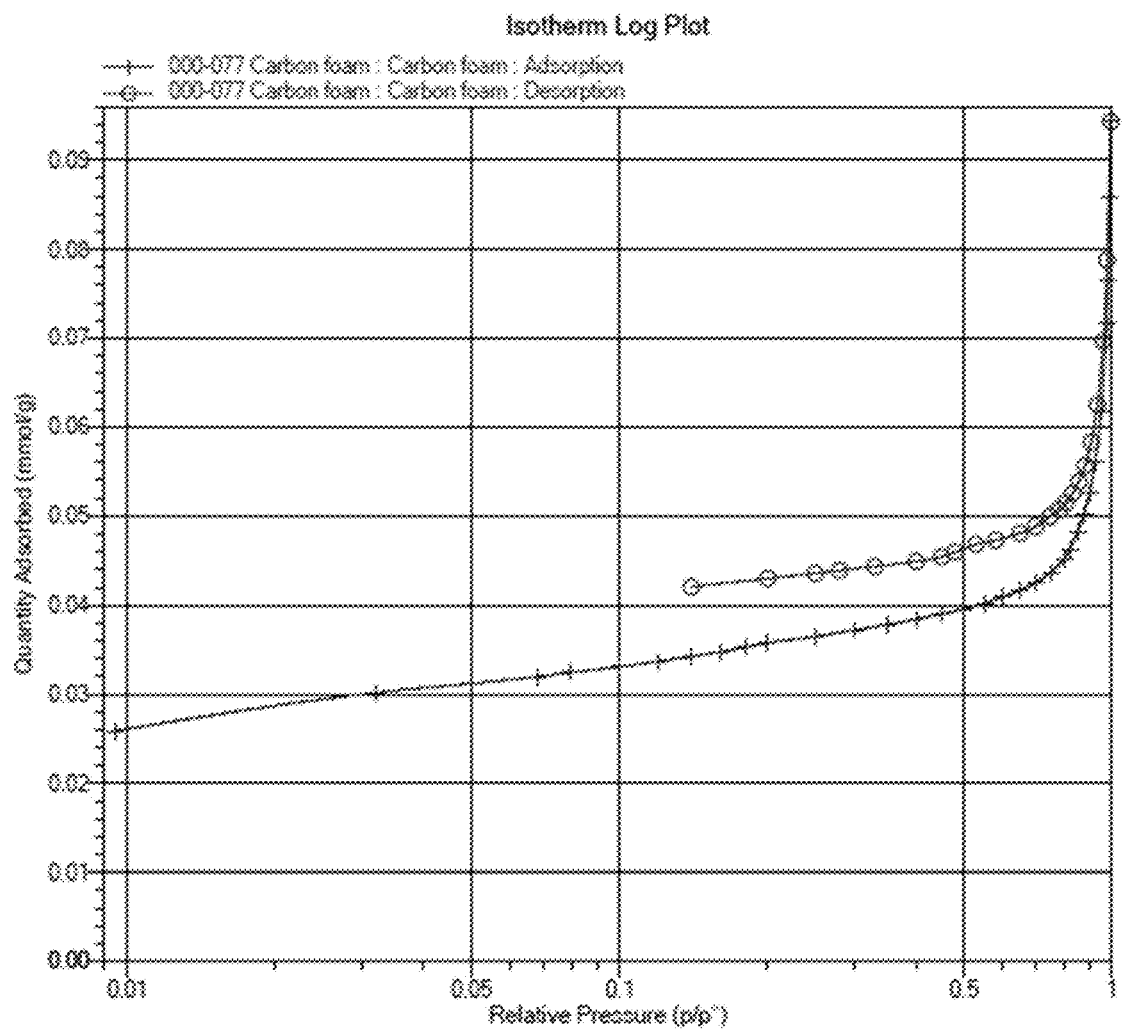
FIG. 23 shows $N_2$ adsorption/desorption isotherms for a sample carbon foam as disclosed herein.

$N_2$ adsorption/desorption isotherms were measured using a Micromeritics ASAP 2420 accelerated surface area and porosimetry system (FIG. 23). Brunauer-Emmett-Teller (BET) surface area was then evaluated using the $N_2$ adsorption data. Surface area was found to be approximately 2.65 $m^2/g$, with bulk density being about 0.78 $g/cm^2$.

The above experiments indicate the analyzed sample was isotropic and likely formed from coal or coal solvent extract. XRD analysis suggests this foam sample was not heat treated post-foaming. Cages observed by SEM-EDS were large (average size about 300 μm) and interconnected, and surface area and density were relatively low.

Figure 24:
FIG. 24 shows a sample carbon foam as disclosed herein; characterization of this foam is presented in FIGS. 25-27. This carbon foam was made starting from coal particles having a mesh size of 20-35 (i.e., particle size about 500-841 μm).
Figure 25:
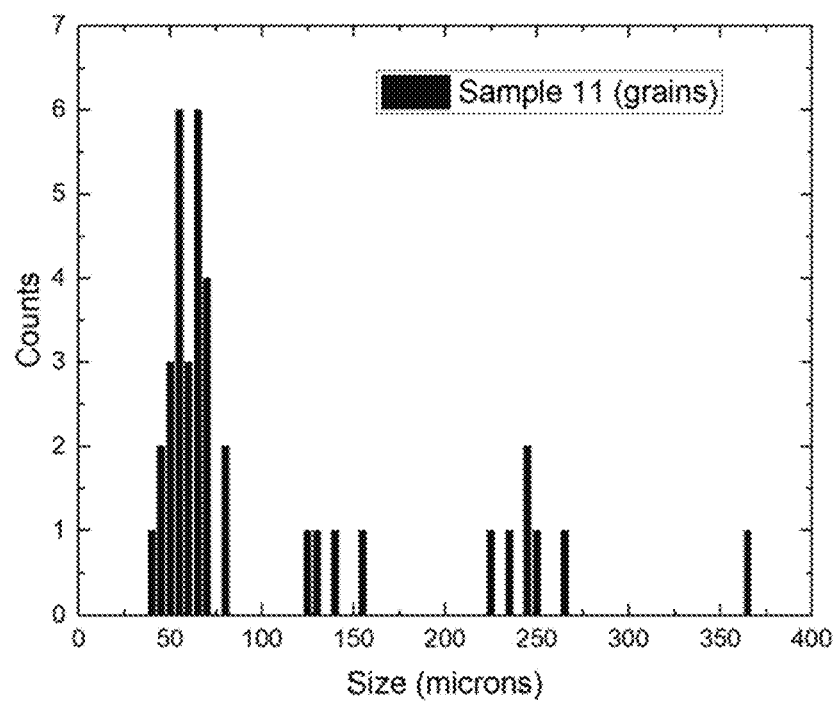
FIG. 25 shows particle size distribution of the carbon foam of FIG. 24. "Counts" on the vertical axis refers to the number of grains counted for each size measured.
Figure 26:
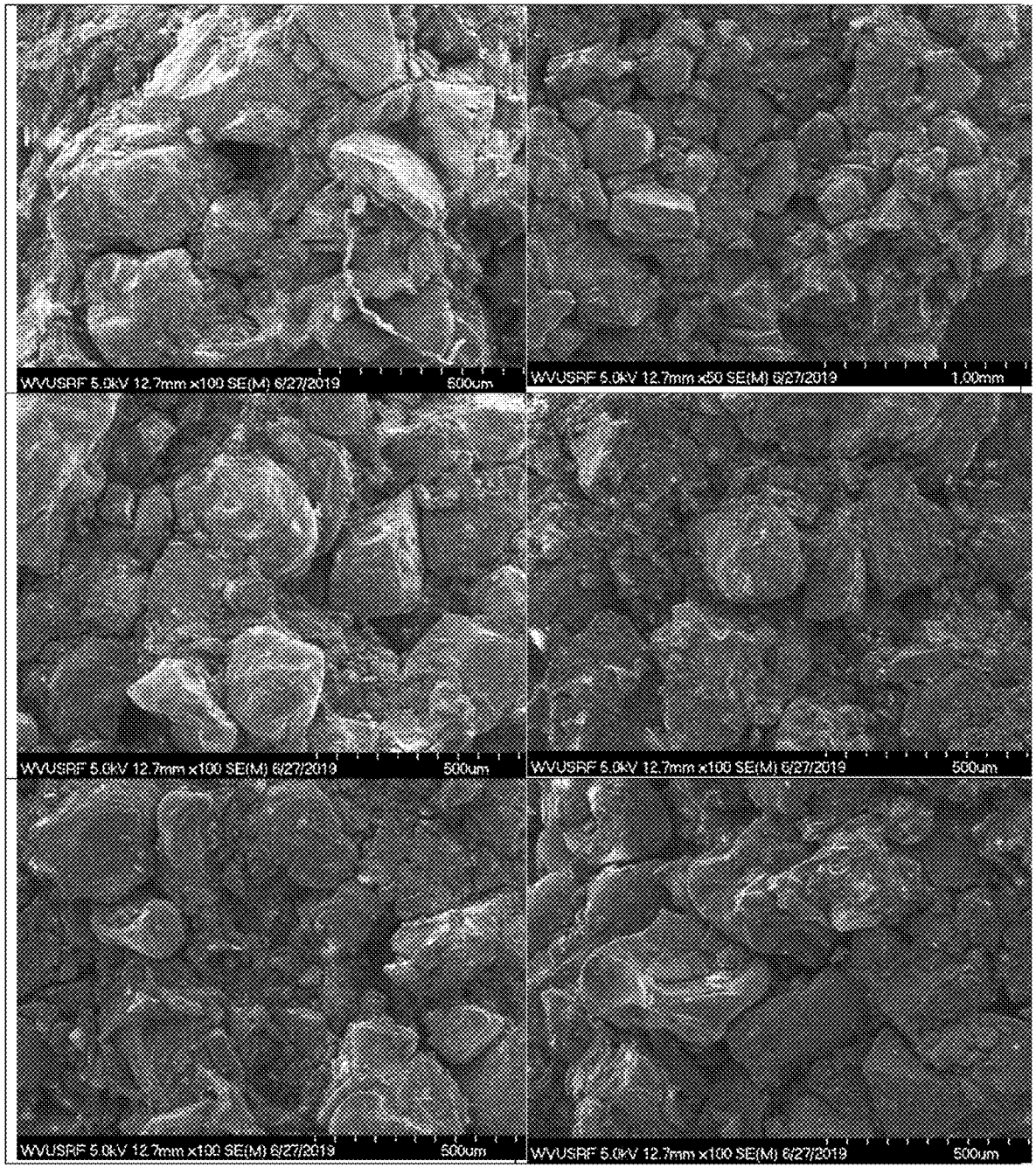
FIG. 26 shows exemplary external surface SEM images of the carbon foam of FIG. 24.
Figure 27:
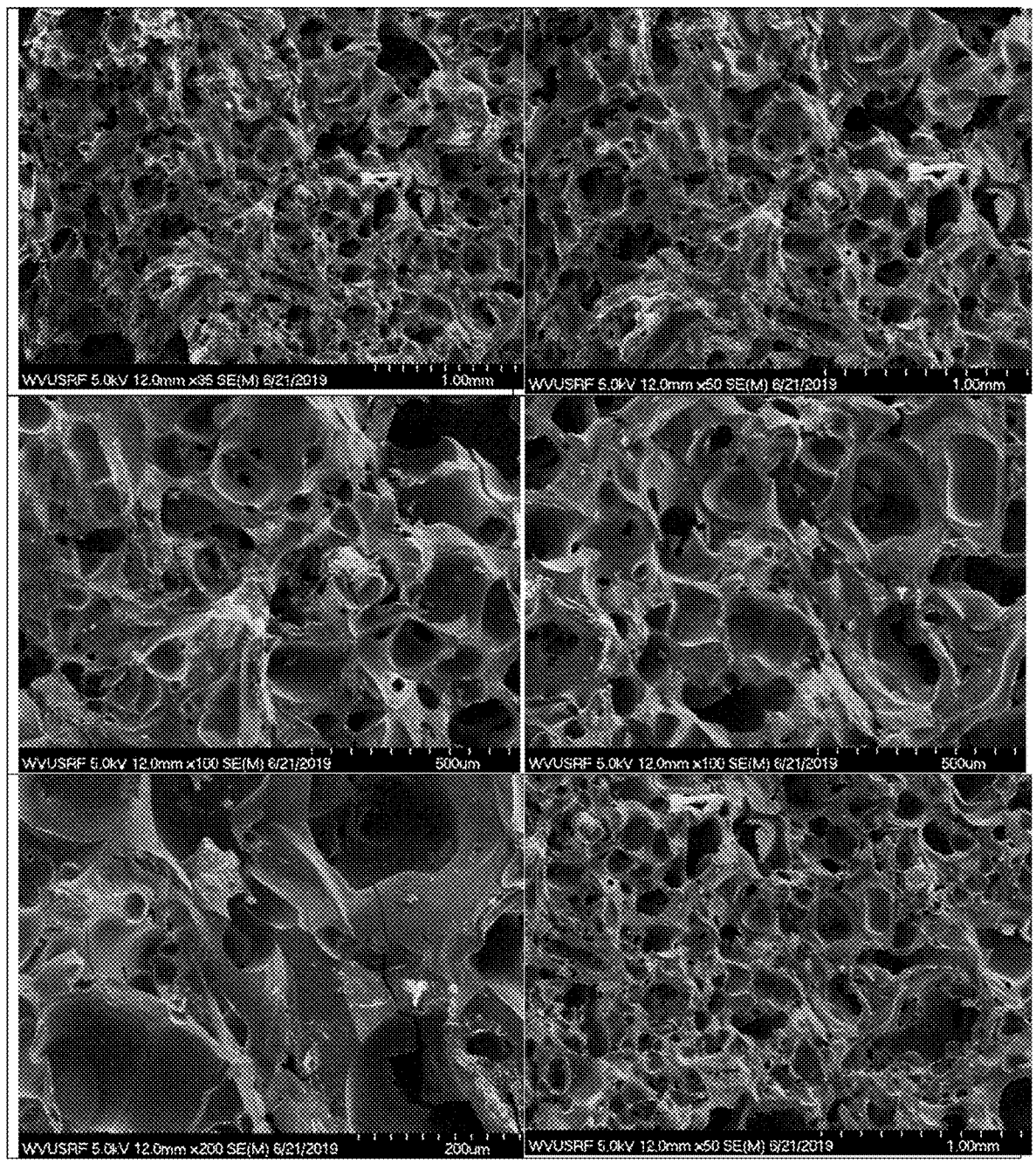
FIG. 27 shows exemplary internal surface SEM images of the carbon foam of FIG. 24.

Particle size distribution and pore size was also assessed using scanning electron microscopy (SEM) for carbon foam samples constructed using different mesh sizes of coal particles. Size distribution was measured for all SEM images with no overlapping areas. FIJI, an open source software package based on ImageJ and Origin scripts were used to measure the dimensions of grains or pores, depending on the sample, directly from SEM images. A carbon foam made from 20-35 mesh coal particles (starting particle size 500-841 μm) (see FIG. 24) shows a grain size ranging from about 40 to about 390 μm with the largest distribution of grains ranging in size from about 40 to about 75 μm (FIG. 25). Example SEM images of external surfaces and internal surfaces/pores are shown in FIGS. 26 and 27, respectively. Scale bars in SEM images were used as a basis for software measurement of dimensions of particle and/or pore size.

When low magnification mode was used, SEM images cover approximately 3.5×2.5 mm of area.

Figure 28:
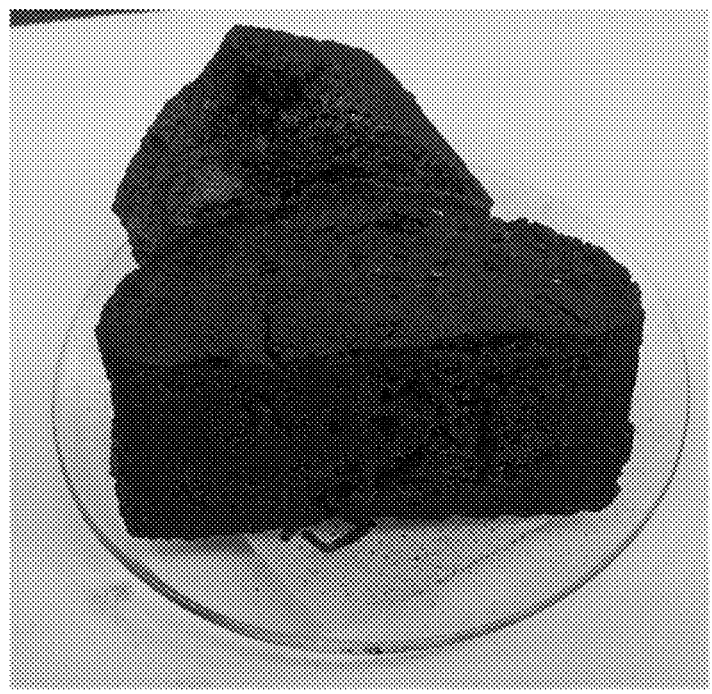
FIG. 28 shows a sample carbon foam as disclosed herein; characterization of this foam is presented in FIGS. 29-31. This carbon foam was made starting from coal particles having a mesh size of 60-100 (i.e., particle size about 149-250 μm).
Figure 29:
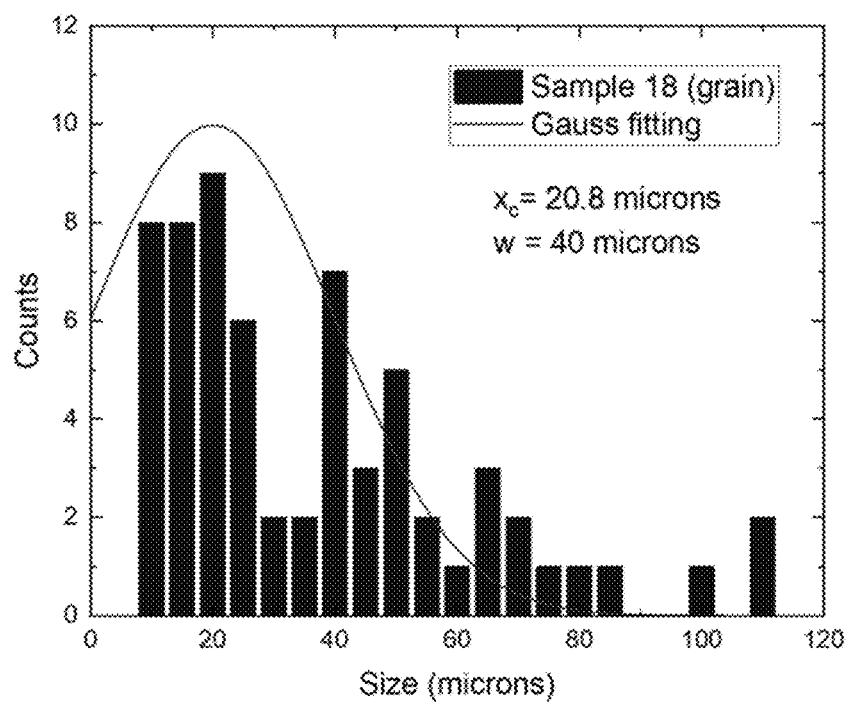
FIG. 29 shows particle size distribution of the carbon foam of FIG. 28.
Figure 30:
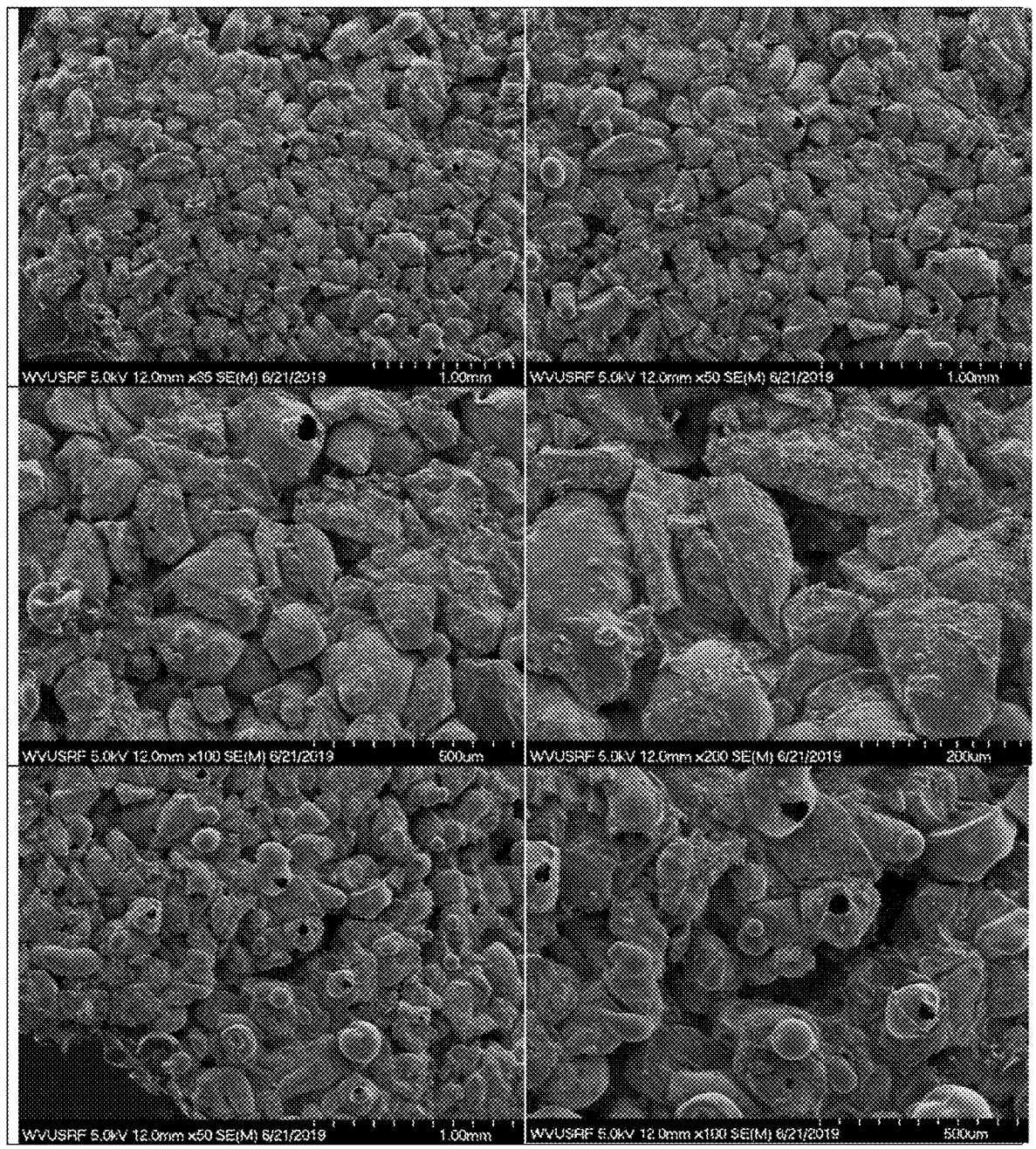
FIG. 30 shows exemplary external surface SEM images of the carbon foam of FIG. 28.
Figure 31:
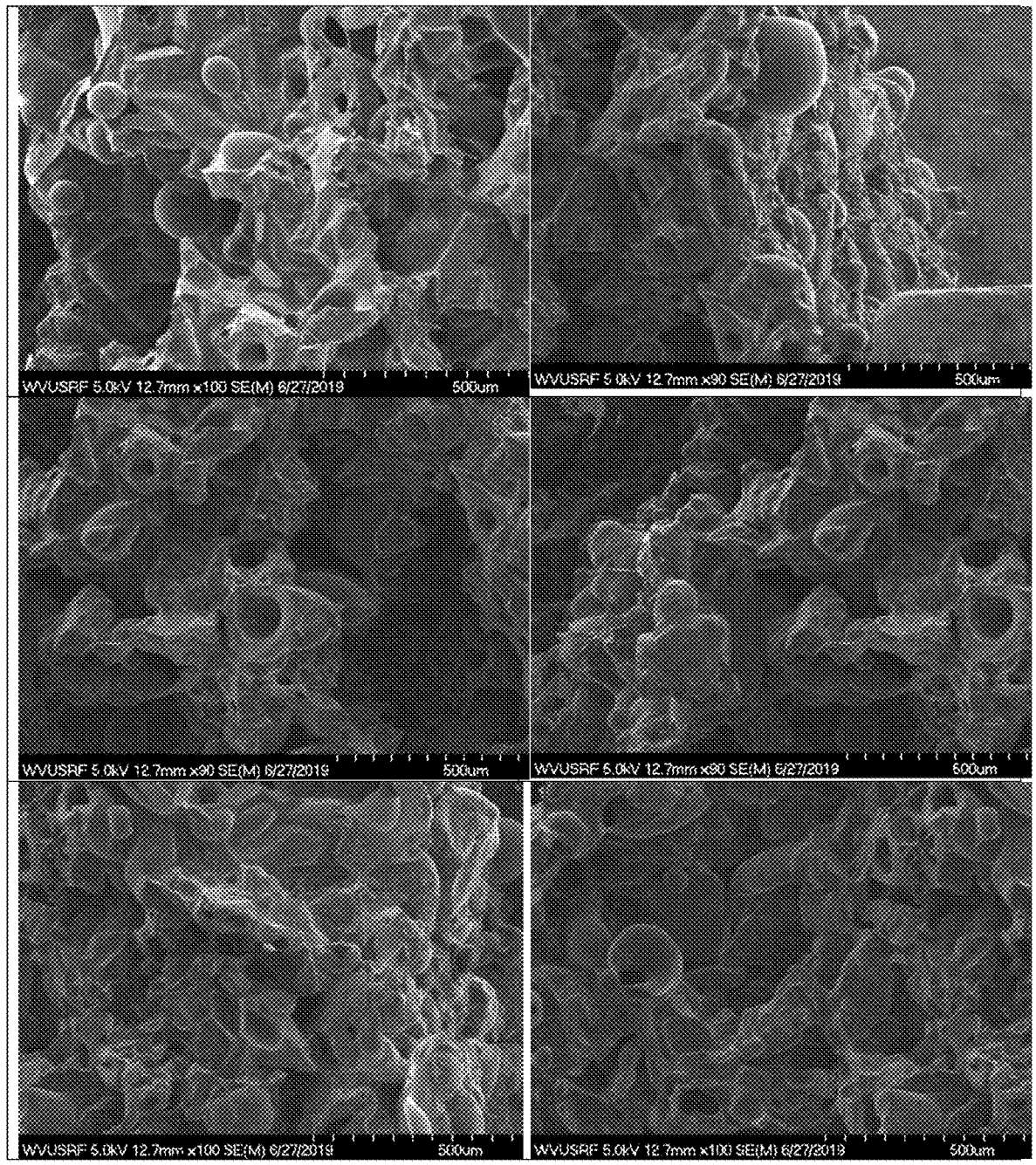
FIG. 31 shows exemplary internal surface SEM images of the carbon foam of FIG. 28.

A carbon foam made from 60-100 mesh coal particles (starting particle size 149-250 μm) (see FIG. 28) shows a grain size ranging from about 10 to about 110 μm with the largest distribution of grains ranging in size from about 10 to about 50 μm (FIG. 29). Example SEM images of external surfaces and internal surfaces/pores are shown in FIGS. 30 and 31, respectively.

Figure 32:
FIG. 32 shows a sample carbon foam as disclosed herein; characterization of this foam is presented in FIGS. 33-35. This carbon foam was made starting from coal particles having a mesh size of >100 (i.e., particle size less than about 149 μm).
Figure 33:
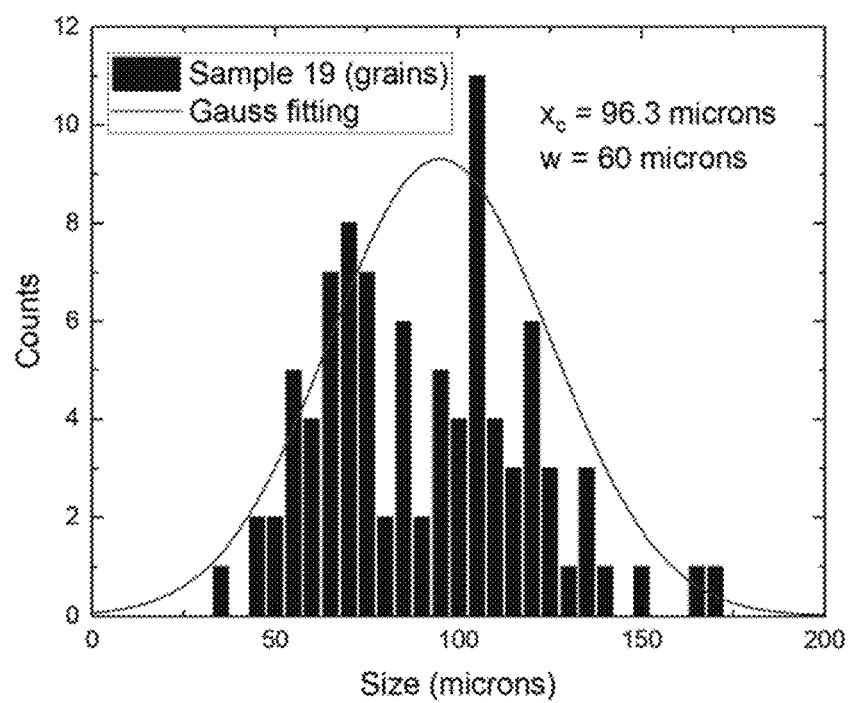
FIG. 33 shows particle size distribution of the carbon foam of FIG. 32.
Figure 34:
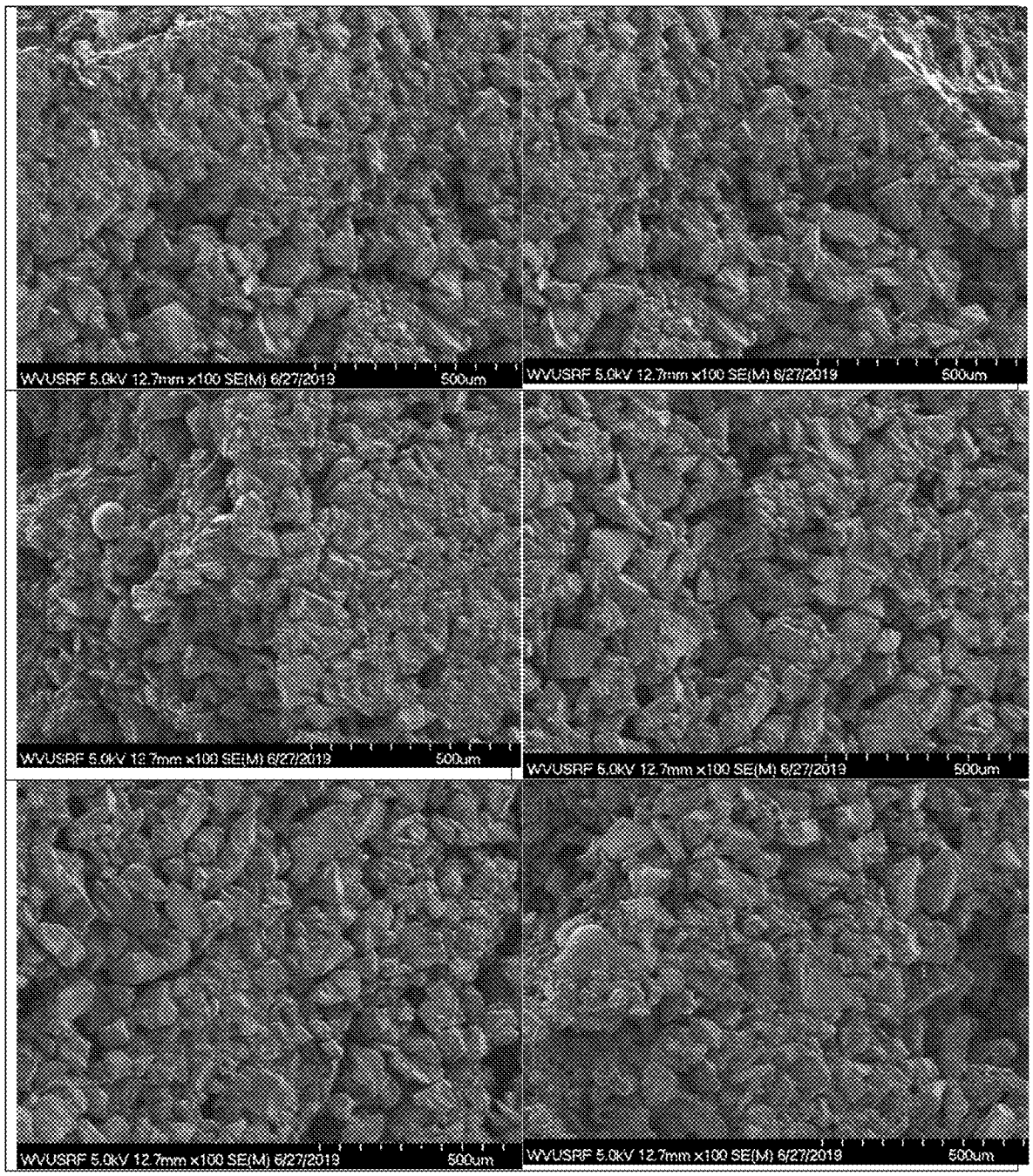
FIG. 34 shows exemplary external surface SEM images of the carbon foam of FIG. 32.
Figure 35:
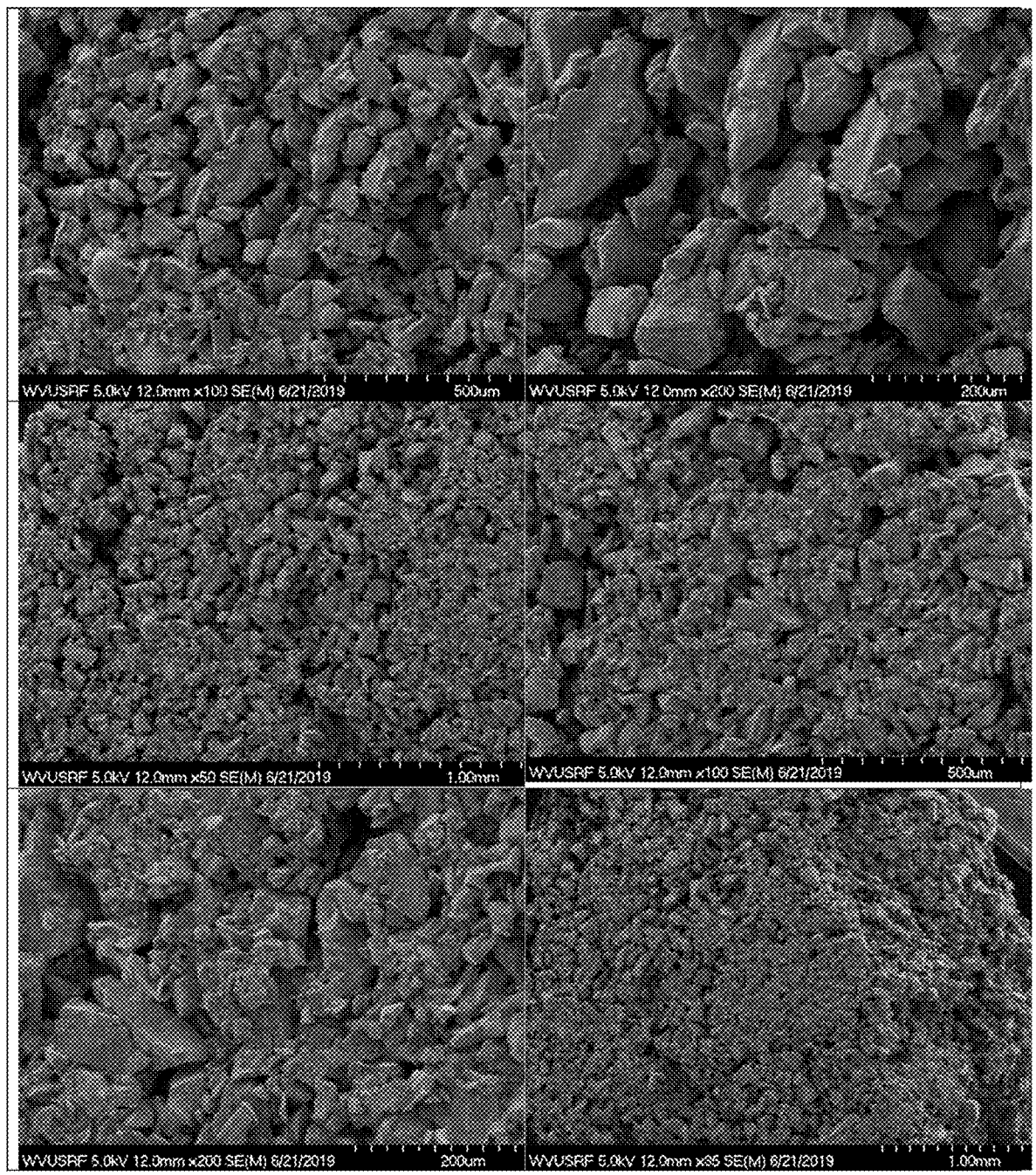
FIG. 35 shows exemplary internal surface SEM images of the carbon foam of FIG. 32.

A carbon foam made from >100 mesh coal particles (starting particle size <149 μm) (see FIG. 32) shows a grain size ranging from about 30 to about 175 μm with the largest distribution of grains ranging in size from about 75 to about 125 μm (FIG. 33). Example SEM images of external surfaces and internal surfaces/pores are shown in FIGS. 34 and 35, respectively.

Figure 36:
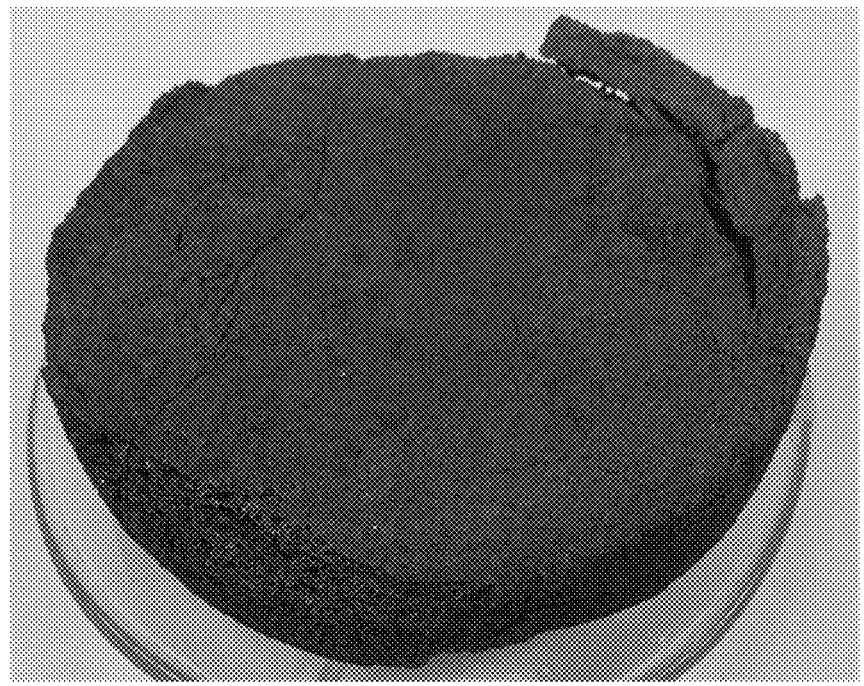
FIG. 36 shows a sample carbon foam as disclosed herein; characterization of this foam is presented in FIGS. 37-39. This carbon foam was made starting from coal particles having a mesh size of 40-60 (i.e., particle size about 250-400 μm).
Figure 37:
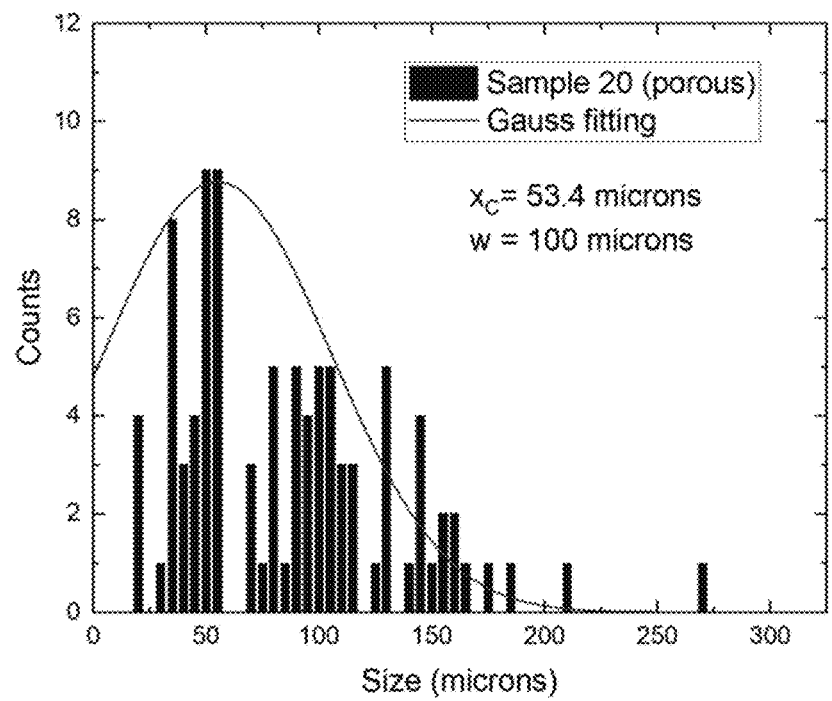
FIG. 37 shows particle size distribution of the carbon foam of FIG. 36.
Figure 38:
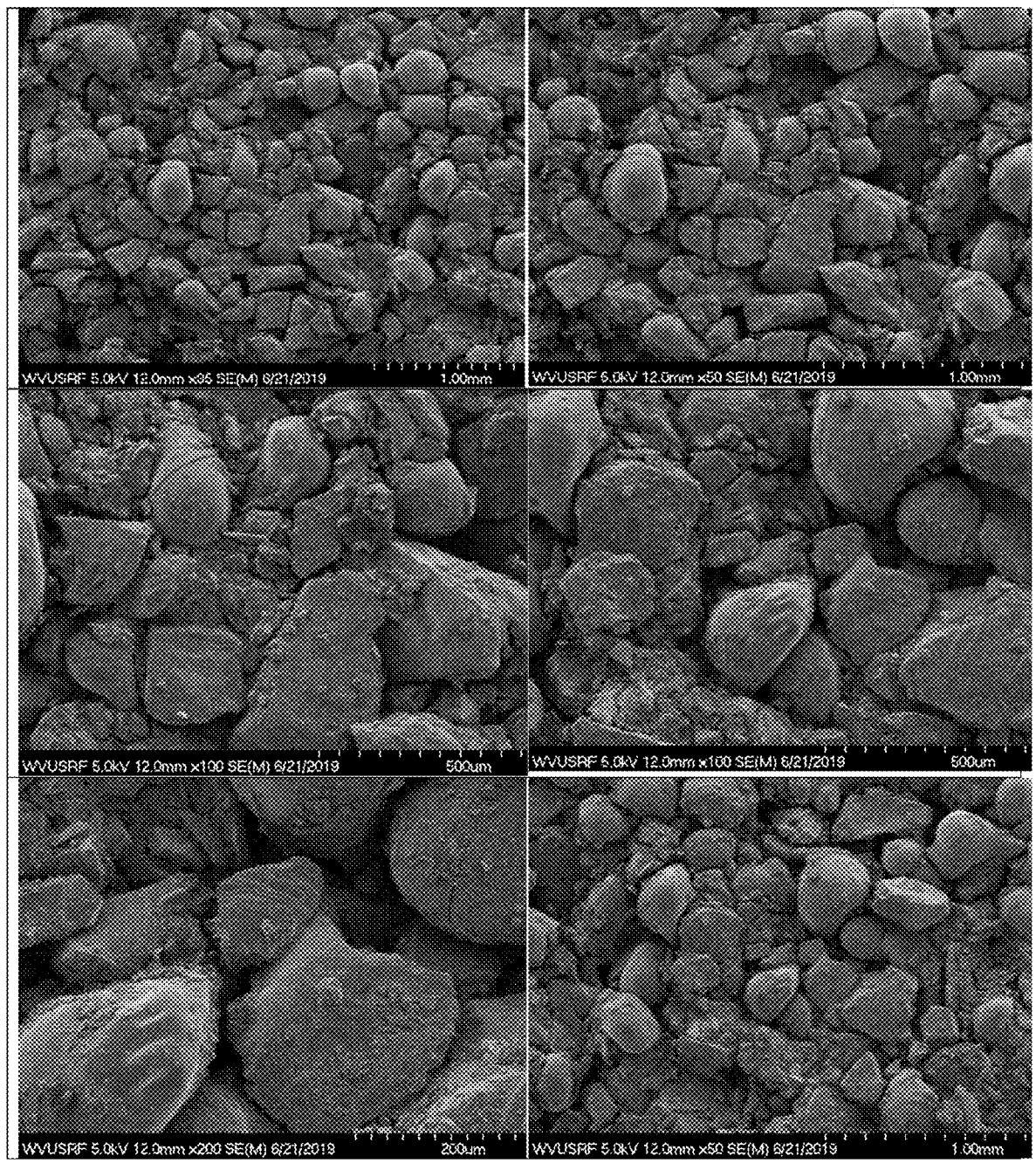
FIG. 38 shows exemplary external surface SEM images of the carbon foam of FIG. 36.
Figure 39:
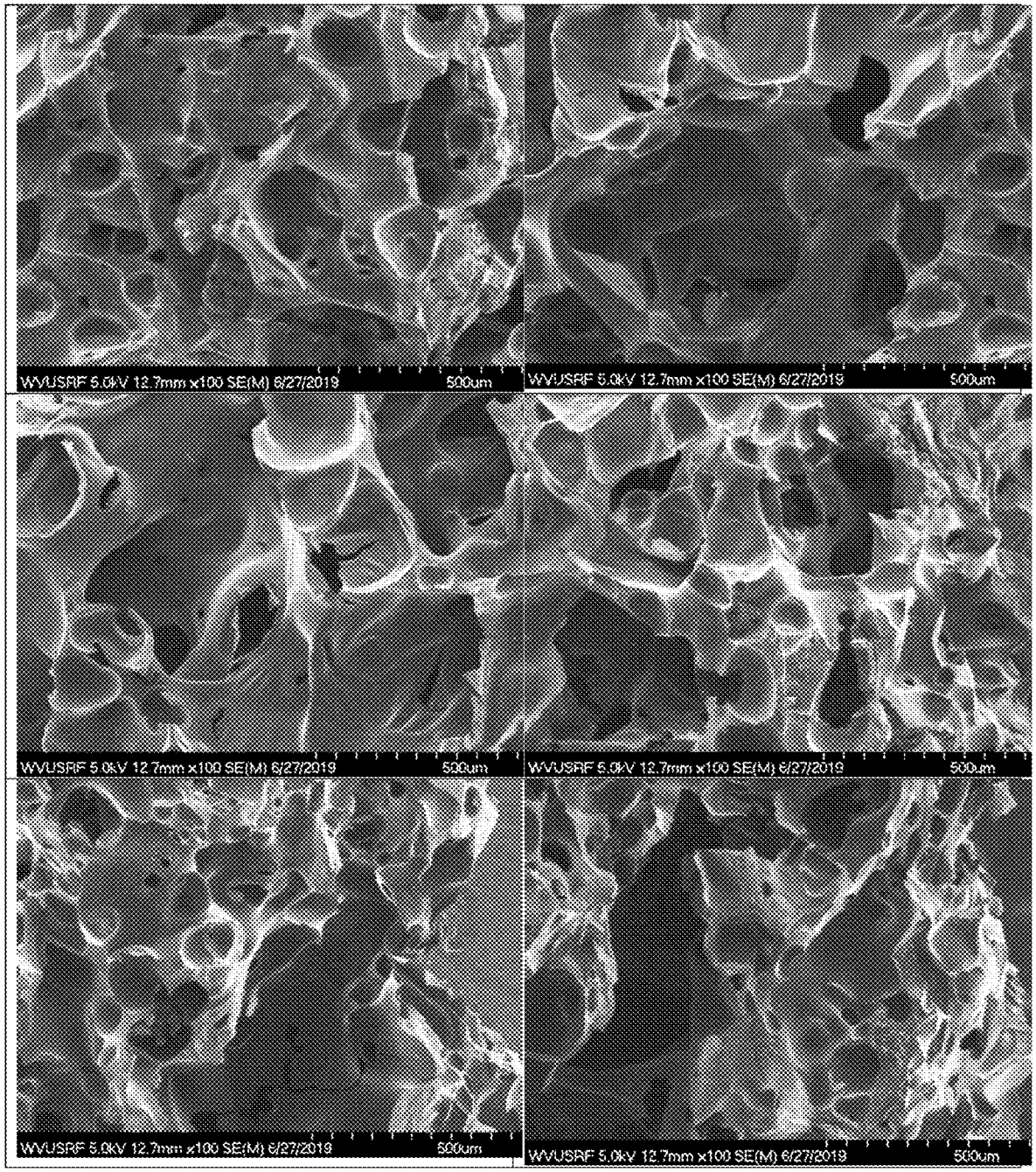
FIG. 39 shows exemplary internal surface SEM images of the carbon foam of FIG. 36.

A carbon foam made from 40-60 mesh coal particles (starting particle size 250-400 μm) (see FIG. 36) shows a grain size ranging from about 25 to about 240 μm with the largest distribution of grains ranging in size from about 40 to about 150 μm (FIG. 37). Example SEM images of external surfaces and internal surfaces/pores are shown in FIGS. 38 and 39, respectively.

Example 10: Single-Step Calcination with High-Volatile Bituminous Coal

In some experiments, carbon foam was produced at atmospheric pressure using high volatile bituminous coal using a single heating step. With a higher volatile amount in the coal, a lower amount of flux agent was needed to create the pseudo-liquid state necessary to fuse particles together during microwave radiation. In these experiments, a coal to flux ratio of 4:1 was used, where the flux agent was high fructose corn syrup with no added carbon conversion process volatiles. Particle size range was generally from 30-50 mesh for these experiments, although other particle sizes were evaluated. It was observed that larger particle sizes led to more consistent mixing with less time and effort required. Process steps were generally similar to those previously described, but with some key differences.

Coal Preparation

High volatile bituminous coal was received in 60 pound plastic bags and processed through a hammer mill to reduce the particle size to approximately 2 mm. The coal was further ground using a mortar and pestle to achieve the desired size range of 30-50 mesh. Initially, 200 g of the 2 mm coal was ground and separated using an assembled stack of sieve trays. Coal outside the desired size range was collected and stored for future use.

Foaming Mixture Preparation

The flux agent used for these experiments was high fructose corn syrup without any added condensed volatiles. Furthermore, the coal to flux agent ratio was reduced compared to previous experiments based on the inherent volatile percentage of feedstock coal. 100 g of 30-50 mesh coal was added to a 250 mL beaker, followed by the addition of 25 g of high fructose corn syrup. The beaker contents were stirred until the foaming mixture became homogeneous. It was not necessary to knead the material by hand. The foaming mixture was then loaded into a crucible in the same manner as in previous experiments.

Post-Microwave Radiation Heat Treatment to Calcination Temperatures

Following microwave radiation to produce foam as described previously, the crucible containing the foam was covered with a ceramic lid and placed in a nonoxidizing environment by immersing the samples in graphite chips and covering with steel wool as previously described. Calcination was accomplished in a furnace programmed with the following temperature ramps:

(a) the furnace was heated at 400° C./h from room temperature to 350° C.;
(b) heating rate was reduced to 100° C./h until 550° C. was reached;
(c) heating rate was reduced to 50° C./h until 700° C. was reached;
(d) temperature was held at 700° C. for one hour;
(e) heating rate was set at 25° C./h until a temperature of 900° C. was reached;
(f) temperature was held at 900° C. for 2 h;
(g) furnace was turned off and contents were allowed to cool for 12 h.

Figure 7:
FIG. 7 shows a representative image of a larger sample of a disclosed carbon foam prepared from low volatile bituminous coal feedstock using a disclosed process and the additional carbon materials produced remaining in the crucible using a disclosed method as described in Example 10.
Figure 8:
FIG. 8 shows a representative image of the underside of the same sample shown in FIG. 7. The image shows trace amounts of composite carbon material formed on the underside of the carbon foam that was in contact with the inner surface of the bottom of the crucible.

Calcined carbon foam was removed and weighed. Samples were assessed for conductivity using a voltmeter and determined to be conductive, thus showing a single heating step to calcination temperatures was effective and that two steps were not required. Example foams produced using high-volatile bituminous coal are shown in FIGS. 7-8.

Example 11: Alternative Feedstocks

Alternative feedstocks to caking coals were explored as source materials for carbon foam. In one series of experiments, a foaming pitch derived from non-caking coal prepared as described above was used as a feedstock.

90 g of foaming pitch with a particle size range of 30-50 mesh was weighed and transferred to a 250 mL beaker and 15 g of a flux agent composed of high fructose corn syrup and recycled coal volatiles as described previously was added. The contents were mixed for a period of time until the mixture was homogeneous. The foaming mixture was loaded into a crucible and converted into carbon foam using microwave radiation at 20% power for 5 min. The foam was covered with a ceramic lid and calcined in one step in a non-oxidizing environment as described previously.

Figure 9:
FIG. 9 shows a representative image of a disclosed carbon foam prepared from foaming pitch using a disclosed method as described in Example 11. The foaming pitch was prepared as described herein. The image further shows (upper left) a layer of graphene oxide that is deposited on the inner surface of the crucible lid.
Figure 10:
FIG. 10 shows a representative image of the underside of the carbon foam shown in FIG. 9. The image shows that a disclosed carbon composite formed from distinct carbon materials fusing together on the bottom surface of the carbon foam that is in contact with the bottom interior surface of the crucible.

A thin layer of a graphene-type compound was found on the lid of the crucible after this experiment, showing that the method can provide an additional carbon species from vapors expelled during the heat treatment and calcination processes disclosed herein. Examples of graphene-type layers formed on carbon foams can be seen in FIGS. 9-10.

Example 12: Process Scale-Up

Figure 16:
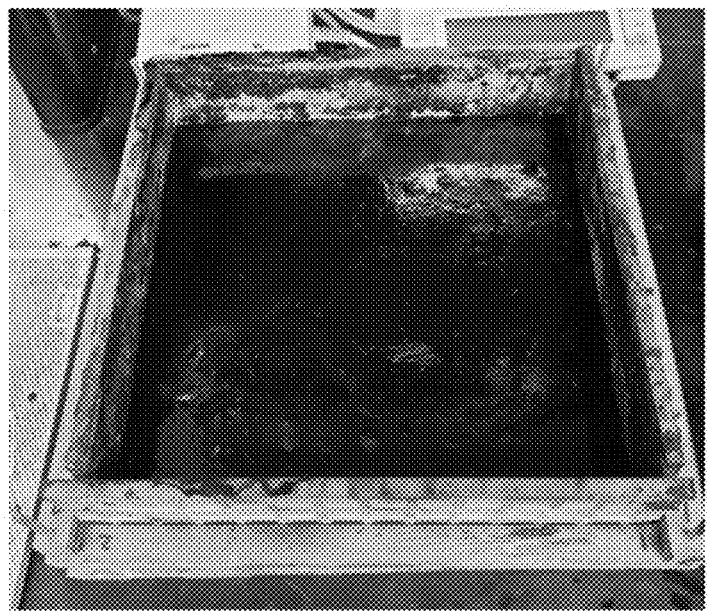
FIG. 16 shows a large precursor carbon/flux mixture prior to microwave exposure.
Figure 17:
FIG. 17 shows a piece of carbon foam resulting from heating of the sample seen in FIG. 16.

In some experiments, larger samples having compositions similar to those described previously (i.e., containing coal powder, high fructose corn syrup, and graphite) but with a top surface area of approximately 1 square foot were prepared. Coal flux mixtures were prepared using a commercial mixer. A square sample container 1 foot on each side was constructed and a large-chamber microwave with rotating coil was obtained for these experiments. Several samples of this size were manufactured successfully using the heating protocols described previously. The container used for large-scale foam production as well as an example large piece of foam are seen in FIGS. 16-17.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A process for producing a carbon foam material, the process comprising:
 a heating step comprising heating a homogeneous mixture of a coal material, at least one conductive carbon material, and a flux agent in a microwave heating apparatus, thereby forming the carbon foam material;
 wherein the coal material has a particle size of between about 10 mesh and about 400 mesh;
 wherein the coal material is present in an amount of from about 20 wt % to about 75 wt % based on the total weight of the mixture;
 wherein the at least one conductive carbon material is present in an amount of from about 25 wt % to about 80 wt % based on the total weight of the mixture;
 wherein the flux agent comprises a carbohydrate syrup; and
 wherein the at least one conductive carbon material is capable of absorbing microwave radiation.

2. The process of claim 1, wherein the heating step comprises heating the mixture to a temperature of from about 250° C. to about 700° C. for from about 1 minute to about 60 minutes.

3. The process of claim 1, wherein the coal material comprises a high-volatile or low-volatile sub-bituminous coal material, pitch, or a combination thereof.

4. The process of claim 1, wherein the homogeneous mixture further comprises a lignocellulosic waste material, a secondary flux agent, a solvent, or a combination thereof.

5. The process of claim 4, wherein the secondary flux agent comprises a volatile compound produced in a coal conversion process, a coal tar, a product of petroleum distillation, or a combination thereof.

6. The process of claim 4, wherein the solvent comprises N-methyl-2-pyrrolidone, kerosene, or a combination thereof.

7. The process of claim 1, wherein the carbohydrate syrup is high fructose corn syrup.

8. The process of claim 1, wherein the at least one conductive carbon material comprises a carbon fiber, a carbon nanofiber, a carbon nanotube, a carbon flake, carbon black, a needle coke, graphene, graphene oxide, graphite, or a combination thereof.

9. The process of claim 1, the process further comprising calcining the carbon foam material, the calcining comprising:
 heating the carbon foam material to a temperature of from about 900° C. to about 1350° C. for a period of from about 10 seconds to about 3 hours, thereby forming a calcined carbon foam material;
 wherein calcining imparts electrical conductivity and mechanical stability to the carbon foam material; and
 wherein the carbon foam material is calcined in a furnace, microwave heating apparatus, an inductive field heater, or a combination thereof.

10. The process of claim 9, wherein the carbon foam material is calcined in a furnace.

11. The process of claim 9, wherein the carbon foam material is calcined in a microwave heating apparatus.

12. The process of claim 9, wherein the carbon foam material is calcined in an inductive field heater.

13. A process for producing a carbon foam material, the process comprising:
 a heating step comprising heating a homogeneous mixture of a coal material and at least one conductive carbon material in a heating apparatus, thereby forming the carbon foam material;
 wherein the coal material has a particle size of between about 10 mesh and about 400 mesh;
 wherein the coal material is present in an amount of from about 20 wt % to about 75 wt % based on the total weight of the mixture; and
 wherein the at least one conductive carbon material is present in an amount of from about 25 wt % to about 80 wt % based on the total weight of the mixture;
 wherein the heating apparatus provides electromagnetic radiation with a wavelength of about 1 m to 1 mm and a frequency between 300 MHz and 300 GHz, provides an alternating magnetic field for inductive heating, or a combination thereof;
 wherein the at least one conductive carbon material is capable of absorbing microwave radiation, interacting with an electromagnetic field, or a combination thereof;
 wherein the homogeneous mixture further comprises a flux agent, a secondary flux agent, a lignocellulosic waste material, a solvent, or a combination thereof; and
 wherein the solvent comprises N-methyl-2-pyrrolidone, kerosene, or a combination thereof.

14. The process of claim 13, wherein the heating apparatus provides electromagnetic radiation with a wavelength of about 1 m to 1 mm and a frequency between 300 MHz and 300 GHz.

15. The process of claim 13, wherein the heating apparatus provides an alternating magnetic field for inductive heating.

16. The process of claim 13, wherein the at least one conductive carbon material comprises a carbon fiber, a carbon nanofiber, a carbon nanotube, a carbon flake, carbon black, a needle coke, graphene, graphene oxide, graphite, or a combination thereof.

17. The process of claim 13, wherein the at least one conductive carbon material is capable of interacting with an alternating magnetic field for inductive heating.

18. The process of claim 13, the process further comprising calcining the carbon foam material, the calcining comprising:
 heating the carbon foam material to a temperature of from about 900° C. to about 1350° C. for a period of from about 10 seconds to about 3 hours, thereby forming a calcined carbon foam material;
 wherein calcining imparts electrical conductivity and mechanical stability to the carbon foam material; and
 wherein the carbon foam material is calcined in a furnace, microwave heating apparatus, an inductive field heater, or a combination thereof.

19. The process of claim 18, wherein the carbon foam material is calcined in a furnace.

20. The process of claim 18, wherein the carbon foam material is calcined in a microwave heating apparatus.

21. The process of claim 18, wherein the carbon foam material is calcined in an inductive field heater.

22. The process of claim 13, wherein the flux agent comprises a carbohydrate syrup.

23. The process of claim 13, wherein the secondary flux agent comprises a volatile compound produced in a coal conversion process, a coal tar, a product of petroleum distillation, or a combination thereof.

* * * * *